US012452145B2

(12) United States Patent
Sevindik

(10) Patent No.: US 12,452,145 B2
(45) Date of Patent: Oct. 21, 2025

(54) COORDINATING CELLULAR AND CABLE/FIBER BROADBAND NETWORKS

(71) Applicant: Charter Communications Operating, LLC, St. Louis, MO (US)

(72) Inventor: Volkan Sevindik, Parker, CO (US)

(73) Assignee: CHARTER COMMUNICATIONS OPERATING, LLC, St. Louis, MO (US)

(*) Notice: Subject to any disclaimer, the term of this patent is extended or adjusted under 35 U.S.C. 154(b) by 0 days.

(21) Appl. No.: 18/199,969

(22) Filed: May 21, 2023

(65) Prior Publication Data

US 2023/0308366 A1 Sep. 28, 2023

Related U.S. Application Data

(62) Division of application No. 17/214,206, filed on Mar. 26, 2021, now Pat. No. 11,695,652.

(51) Int. Cl.
*H04L 41/50* (2022.01)
*H04L 12/14* (2024.01)
(Continued)

(52) U.S. Cl.
CPC ...... *H04L 41/5029* (2013.01); *H04L 12/1407* (2013.01); *H04L 12/1442* (2013.01);
(Continued)

(58) Field of Classification Search
CPC ............ H04L 41/5029; H04L 12/1407; H04L 12/1442; H04L 41/5012; H04L 41/5025; H04L 41/507

See application file for complete search history.

(56) References Cited

U.S. PATENT DOCUMENTS 7,792,963 B2  9/2010 Gould et al.
11,695,652 B2  7/2023 Sevindik
(Continued)

FOREIGN PATENT DOCUMENTS

KR  101514027 B1 * 4/2015

OTHER PUBLICATIONS

Wi-Fi Data Rates, Channels and Capacity, By Cees Links (Year: 2017).*

(Continued)

*Primary Examiner* — William G Trost, IV
*Assistant Examiner* — Monishwar Mohan
(74) *Attorney, Agent, or Firm* — Otterstedt & Kammer PLLC

(57) ABSTRACT

Detect, at a cable/fiber broadband network termination unit of a cable/fiber broadband multi-service operator, an interruption in service to a cable/fiber broadband network customer unit-small cell pair. Responsive to detecting the interruption, the termination unit advises a charging server of the operator of the interruption in service, a corresponding identifier of the customer unit-small cell pair, and a corresponding account identifier. Responsive to termination unit advising the charging server, the charging server advises a backend server of an associated cellular network of a customer identifier corresponding to the account identifier. Responsive to the charging server advising the backend server, the backend server advises a policy control function of the associated cellular network to modify network parameters of the associated cellular network to compensate for the interruption in service.

13 Claims, 14 Drawing Sheets

(51) Int. Cl.
 H04L 41/5009 (2022.01)
 H04L 41/5025 (2022.01)
 H04L 41/507 (2022.01)
(52) U.S. Cl.
 CPC ...... H04L 41/5012 (2013.01); H04L 41/5025 (2013.01); H04L 41/507 (2013.01)

(56) References Cited

U.S. PATENT DOCUMENTS

| | | | |
|---|---|---|---|
| 2003/0056217 | A1 | 3/2003 | Brooks |
| 2006/0130107 | A1 | 6/2006 | Gonder et al. |
| 2007/0217436 | A1 | 9/2007 | Markley et al. |
| 2009/0248794 | A1 | 10/2009 | Helms |
| 2010/0313236 | A1 | 12/2010 | Straub |
| 2011/0116419 | A1 | 5/2011 | Cholas |
| 2012/0082115 | A1* | 4/2012 | Puthenpura ........... H04W 28/20 370/329 |
| 2016/0007287 | A1* | 1/2016 | Sen ....................... H04W 4/023 709/228 |
| 2016/0164835 | A1* | 6/2016 | Hoffmann ........... H04L 63/0272 726/1 |
| 2017/0180244 | A1* | 6/2017 | Hodroj ............... H04W 28/0866 |
| 2019/0311430 | A1 | 10/2019 | Raleigh |
| 2019/0320494 | A1* | 10/2019 | Jayawardene .......... H04L 67/12 |
| 2019/0363523 | A1 | 11/2019 | Claussen |
| 2021/0185738 | A1* | 6/2021 | John ..................... H04W 72/56 |
| 2022/0311682 | A1 | 9/2022 | Sevindik |

OTHER PUBLICATIONS

Efram, SIM Cards: What is the difference between ICCID, IMSI and IMEI numbers? May 22, 2015. Downloaded https://m.blog.naver.com/framkang/220363349346. pp. 1-3.
Wireless Innovation Forum, CBRS Baseline Standards Release 1, Mar. 16, 2021, Downloaded https://cbrs.wirelessinnovation.org/release-1-standards-specifications. pp. 1-3.
Wireless Innovation Forum, Enhancements to CBRS Baseline Standards (Release 2), Mar. 16, 2021, Downloaded https://cbrs.wirelessinnovation.org/enhancements-to-baseline-specifications. pp. 1-2.
OnGo Alliance, Key Published Specs, Mar. 16, 2021, Downloaded https://www.cbrsalliance.org/specifications/. pp. 1-4.
Wikipedia, Small cell, Feb. 26, 2021, Downloaded https://en.wikipedia.org/wiki/Small_cell. pp. 1-5.
Signaling Protocols and Procedures for Citizens Broadband Radio Service (CBRS): Spectrum Access System (SAS)—Citizens Broadband Radio Service Device (CBSD) Interface Technical Specification Document WINNF-TS-0016 Version V1.2.6 Nov. 25, 2020 60 pages total.
WInnForum CBRS Certificate Policy Specification Document WINNF-TS-0022 Version V1.5.0 Nov. 17, 2020 88 pages total.
Test and Certification for Citizens Broadband Radio Service (CBRS); Conformance and Performance Test Technical Specification; SAS as Unit Under Test (UUT) Document WINNF-TS-0061Version V1.5.1 Oct. 7, 2019 196 pages total.
CBRS Communications Security Technical Specification Document WINNF-TS-0065 Version V1.3.0 Nov. 17, 2020 25 pages total.
CBRS Operational Security Document WINNF-TS-0071 Version V1.0.0 (Formerly WINNF-15-S-0071-V1.0.0) Jul. 26, 2017 11 pages total.
Signaling Protocols and Procedures for Citizens Broadband Radio Service (CBRS): Spectrum Access System (SAS)—SAS Interface Technical Specification Document WINNF-TS-0096 Version 1.3.2 Mar. 13, 2020 44 pages total.
Requirements for Commercial Operation in the U.S. 3550-3700 MHz Citizens Broadband Radio Service Band Document WINNF-TS-0112 Version V1.9.1 Mar. 11, 2020 81 pages total.
Test and Certification for Citizens Broadband Radio Service (CBRS); Conformance and Performance Test Technical Specification; CBSD/DPas Unit Under Test (UUT)Working Document WINNF-TS-0122Version V1.0.2 Nov. 25, 2020 84 pages total.
Operations for Citizens Broadband Radio Service (CBRS): Priority Access License (PAL) Database Technical Specification Document WINNF-TS-0245 Version V1.2.0 Mar. 3, 2021 11 pages total.
CBRS Certified Professional Installer Accreditation Technical Specification Document WINNF-TS-0247Version V1.5.0 Oct. 27, 2020 19 pages total.
CBRS Operational and Functional Requirements (Release 2) Document WINNF-TS-1001 Version V1.2.0 Nov. 19, 2020 27 pages total.
Signaling Protocols and Procedures for Citizens Broadband Radio Service (CBRS): Extensions to Spectrum Access System (SAS)—Citizens Broadband Radio Service Device (CBSD) Interface Technical Specification (Release 2) Document WINNF-TS-3002 Version V1.1.0 Sep. 30, 2020 57 pages total.
Signaling Protocols and Procedures for Citizens Broadband Radio Service (CBRS): Extensions to Spectrum Access System (SAS)—SAS Interface Technical Specification (Release 2) Document WINNF-TS-3003 VersionV1.1.0 Sep. 30, 2020 25 pages total.
Test and Certification for Citizens Broadband Radio Service (CBRS); Conformance and Performance Test Technical Specification; CBSD/DPas Unit Under Test (UUT) (Release 2) Document WINNF-TS-4004 Version V1.0.0 Sep. 30, 2020 114 pages total.
CBRS Release 2 Self-Testing Policy Document WINNF-TS-4005 Version V1.0.0 May 14, 2020 11 pages total.
CBSD Antenna Pattern Database Technical Specification Document WINNF-TS-5006 Version V1.0.0 Sep. 29, 2020 11 pages total.
CBRS Alliance Identifier Management: Database and User Interface Design CBRSA-TR-0102 V1.0.0 Mar. 5, 2019 31 pages total.
CBRS Alliance Identifier Administration Guidelines for Shared HNI CBRSA-TR-0101 V1.0.0 Jan. 21, 2019 12 pages total.
CBRS Alliance Identifier Guidelines for Shared HNI CBRSA-TR-0100 V1.0.0 Nov. 27, 2018 18 pages total.
CBRS Network Services Use Cases and Requirements CBRSA-TS-1001 V3.0.0 Feb. 18, 2020 49 pages total.
CBRS Network Services Stage 2 and 3 SpecificationCBRSA-TS-1002 V3.1.006-23-2020 55 pages total.
Extended Subscribers Authentication Technical Specifications CBRSA-TS-1003 V3.0.0 Feb. 18, 2020 57 pages total.
CBRS Coexistence Technical Specifications CBRSA-TS-2001 V3.1.0 Jul. 17, 2020 36 pages total.

* cited by examiner

COORDINATING CELLULAR AND CABLE/FIBER BROADBAND NETWORKS

CROSS-REFERENCE TO RELATED APPLICATION(S)

This application is a divisional of U.S. patent application Ser. No. 17/214,206 filed Mar. 26, 2021. The complete disclosure of U.S. patent application Ser. No. 17/214,206 is expressly incorporated herein by reference in its entirety for all purposes.

FIELD OF THE INVENTION

The present invention relates generally to the electrical, electronic and computer arts, and, more particularly, to interactions between cable/fiber broadband networks and cellular networks.

BACKGROUND OF THE INVENTION

An operator of a video content network (or other cable/fiber broadband network), such as a cable multi-service operator (MSO), may also offer a mobile phone service. The MSO may also place small cells inside stores or other premises. An MSO may have a network including millions of small cells. Cable/fiber broadband networks typically have certain up-time probabilities, which are less than 100%, and this means there will be network outages as part of normal operation. Some outages happen because of equipment failures, fiber issues, router/switch issues, etc.

SUMMARY OF THE INVENTION

Principles of the invention provide techniques for coordinating cellular and cable/fiber broadband networks. In one aspect, an exemplary method includes detecting, at a cable/fiber broadband network termination unit of a cable/fiber broadband multi-service operator, an interruption in service to a cable/fiber broadband network customer unit-small cell pair; responsive to detecting the interruption, the cable/fiber broadband network termination unit advising a charging server of the cable/fiber broadband multi-service operator of the interruption in service, a corresponding identifier of the cable/fiber broadband network customer unit-small cell pair, and a corresponding account identifier; responsive to the cable/fiber broadband network termination unit advising the charging server, the charging server of the cable/fiber broadband multi-service operator advising a backend server of an associated cellular network of a customer identifier corresponding to the account identifier; and, responsive to the charging server advising the backend server, the backend server of the associated cellular network advising a policy control function of the associated cellular network to modify network parameters of the associated cellular network to compensate for the interruption in service.

In another aspect, an exemplary system includes a cable/fiber broadband network customer unit-small cell pair; a cable/fiber broadband network termination unit of a cable/fiber broadband multi-service operator, coupled to the cable/fiber broadband network customer unit-small cell pair; a charging server of the cable/fiber broadband multi-service operator, coupled to the cable/fiber broadband network termination unit; a backend server of a cellular network associated with the cable/fiber broadband multi-service operator, coupled to the charging server; and a policy control function server of the associated cellular network, coupled to the backend server. The cable/fiber broadband network termination unit is configured to detect an interruption in service to the cable/fiber broadband network customer unit-small cell pair; the cable/fiber broadband network termination unit is configured, responsive to detecting the interruption, to advise the charging server of the interruption in service, a corresponding identifier of the cable/fiber broadband network customer unit-small cell pair, and a corresponding account identifier. Furthermore, the charging server is configured, responsive to the cable/fiber broadband network termination unit advising the charging server, to advise the backend server of a customer identifier corresponding to the account identifier; and the backend server is configured, responsive to the charging server advising the backend server, to advise the policy control function server to modify network parameters of the associated cellular network to compensate for the interruption in service.

In still another aspect, another exemplary method includes determining a number of Wi-Fi enabled devices present in association with premises having Wi-Fi connectivity to a cable/fiber broadband network that also provides cellular service; calculating an average Wi-Fi speed per Wi-Fi enabled device by dividing an overall data rate associated with the premises by the number of Wi-Fi enabled devices present; and, for those of the Wi-Fi enabled devices corresponding to customers of the cable/fiber broadband network, adjusting corresponding cellular service to corresponding ones of the customers based on the average Wi-Fi speed.

In an even further aspect, an exemplary system includes a cable/fiber broadband network Wi-Fi access point; a cable/fiber broadband network Wi-Fi controller of a cable/fiber broadband multi-service operator, coupled to the cable/fiber broadband network Wi-Fi access point; a backend server of a cellular network associated with the cable/fiber broadband multi-service operator, coupled to the Wi-Fi controller; and a policy control function server of the associated cellular network, coupled to the backend server. The Wi-Fi access point and the Wi-Fi controller are cooperatively configured to: determine a number of Wi-Fi enabled devices present in association with premises having Wi-Fi connectivity to a cable/fiber broadband network that also provides cellular service; and calculate an average Wi-Fi speed per Wi-Fi enabled device by dividing an overall data rate associated with the premises by the number of Wi-Fi enabled devices present. The Wi-Fi controller, the backend server, and the policy control function server are cooperatively configured to, for those of the Wi-Fi enabled devices corresponding to customers of the cable/fiber broadband network, adjust corresponding cellular service to corresponding ones of the customers based on the average Wi-Fi speed.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a non-transitory machine-readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps (or a system wherein one or more such apparatuses are networked together, optionally with one or more other components). Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Aspects of the present invention can provide substantial beneficial technical effects. For example, one or more embodiments of the invention achieve one or more of:
- ability to seamlessly, in real time, compensate for a service interruption on a cable/fiber broadband network by enhancing service on an associated cellular network; and
- ability to seamlessly, in real time, coordinate speed or other quality of service parameters between a cable/fiber broadband network and an associated cellular network.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Figure 1:
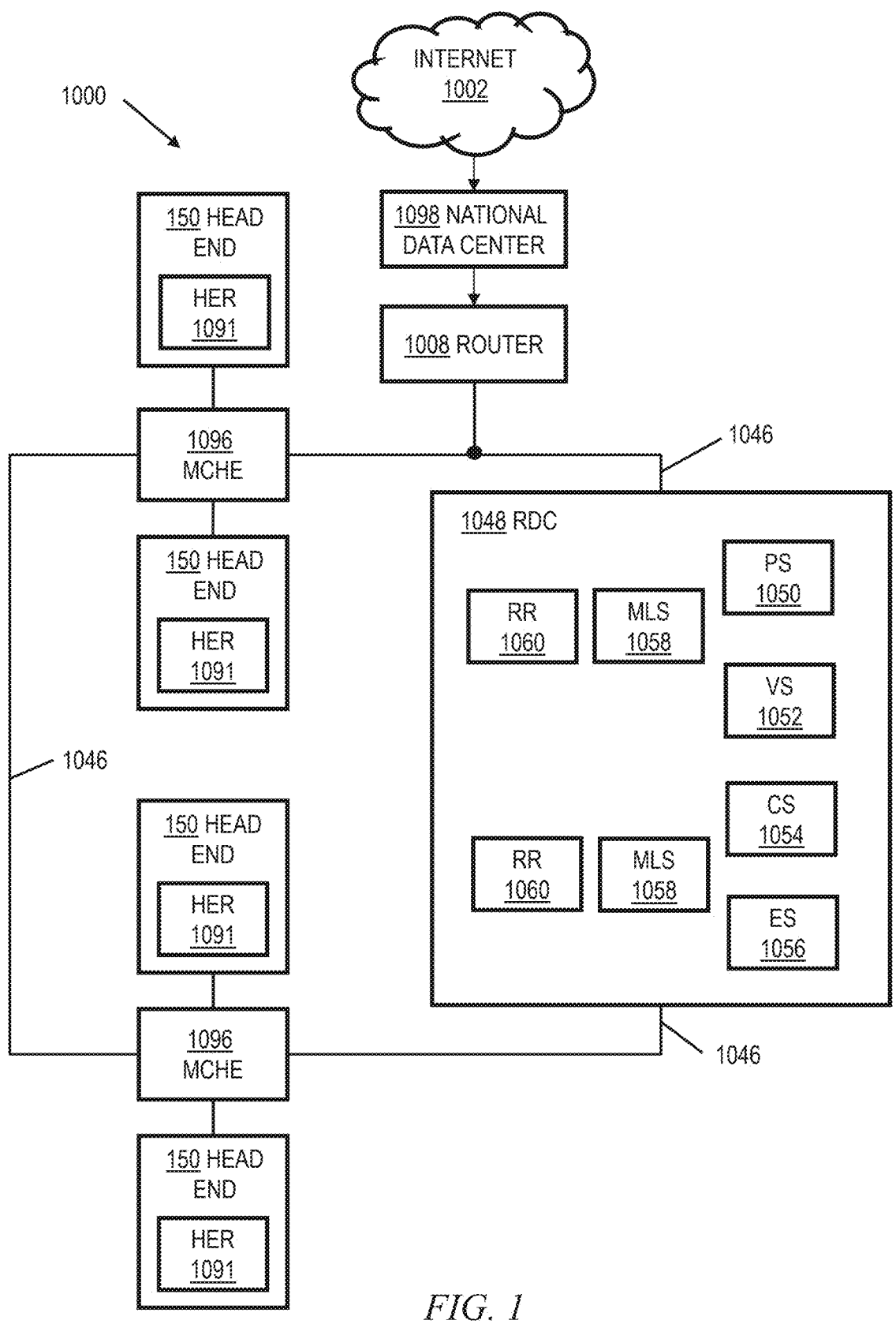
FIG. 1 is a block diagram of an exemplary embodiment of a system, within which one or more aspects of the invention can be implemented.

Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area(s). In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP) (transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, California, USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers(ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
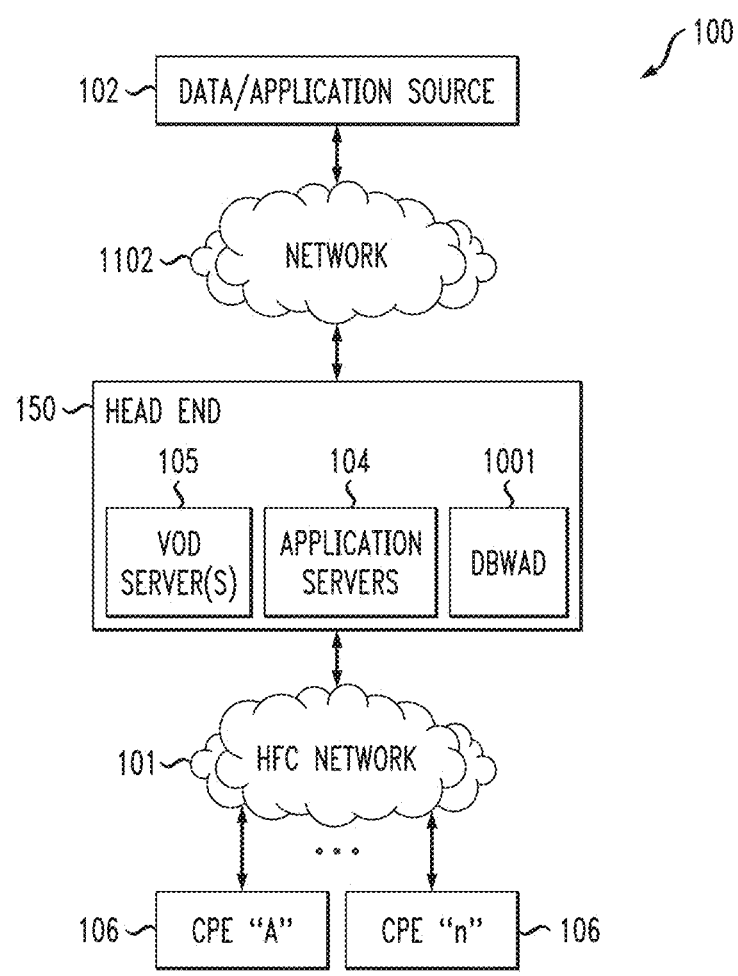
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ Service ONUs (S-ONUs; ONU=optical network unit) as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third-party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g., FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
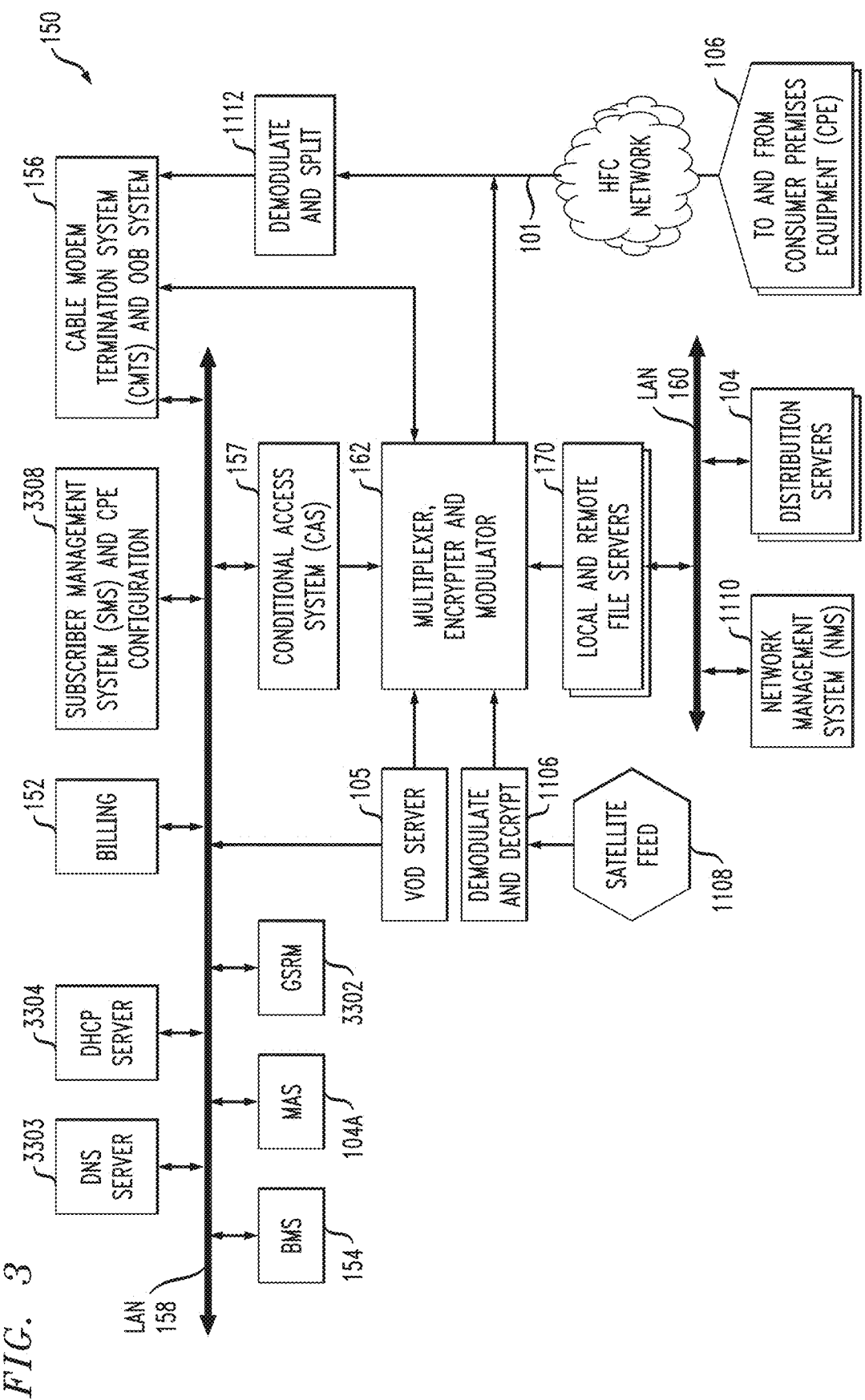
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville CO 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. HFC systems using DOCSIS to transmit data are one non-limiting exemplary application context for one or more embodiments. However, one or more embodiments are applicable to a variety of different kinds of networks.

It is also worth noting that the use of DOCSIS Provisioning of EPON (Ethernet over Passive Optical Network) or "DPoE" (Specifications available from CableLabs, Louisville, CO, USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

It should be noted that the exemplary architecture in FIG. 3 shows a traditional location for the CMTS 156 in a head end. As will be appreciated by the skilled artisan, CMTS functionality can be moved down closer to the customers or up to a national or regional data center or can be dispersed into one or more locations.

Figure 4:
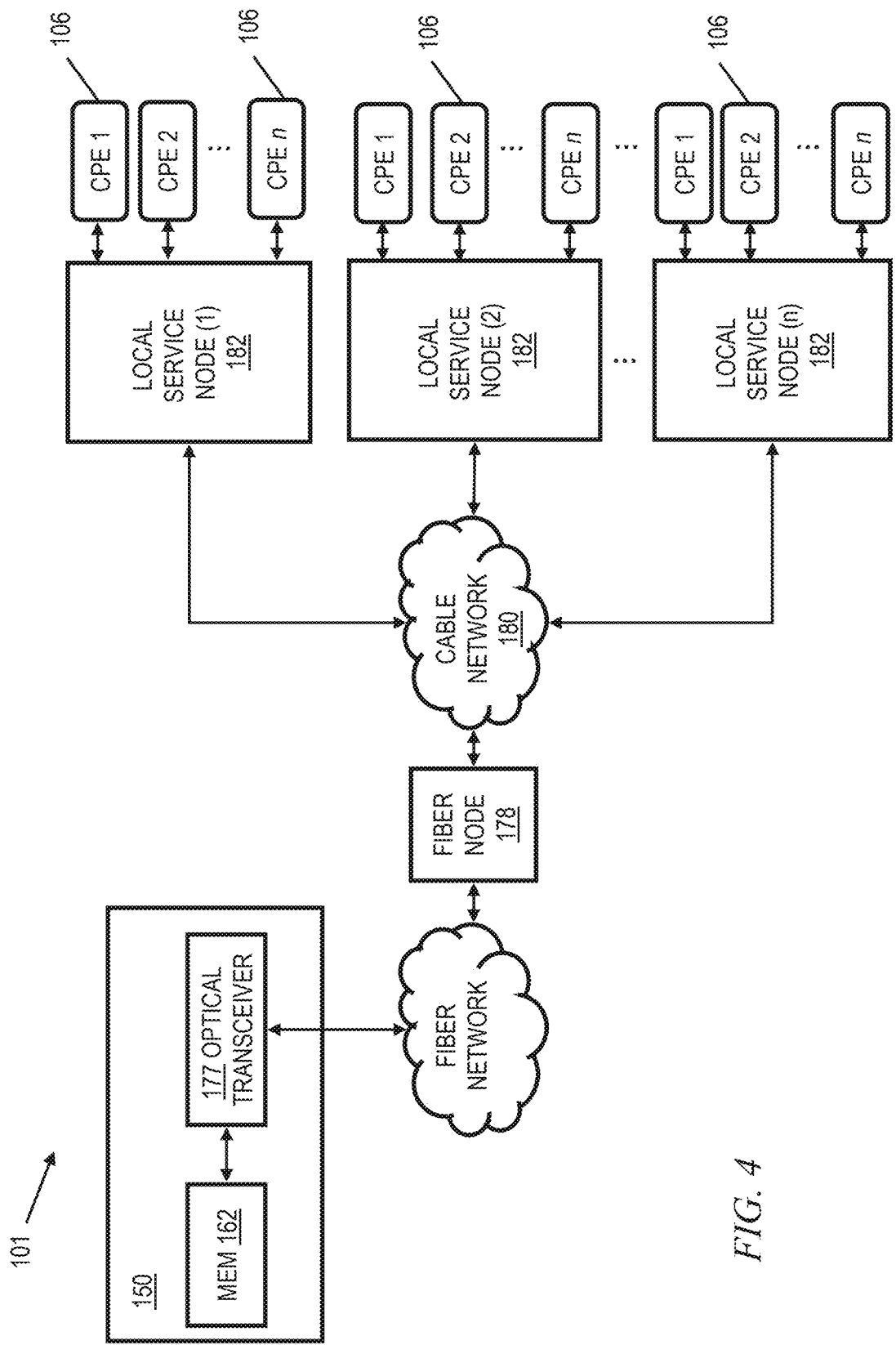
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network 179 to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed. It should be understood that embodiments of the invention have broad applicability to a variety of different types of networks. Some embodiments relate to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"-it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001. US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
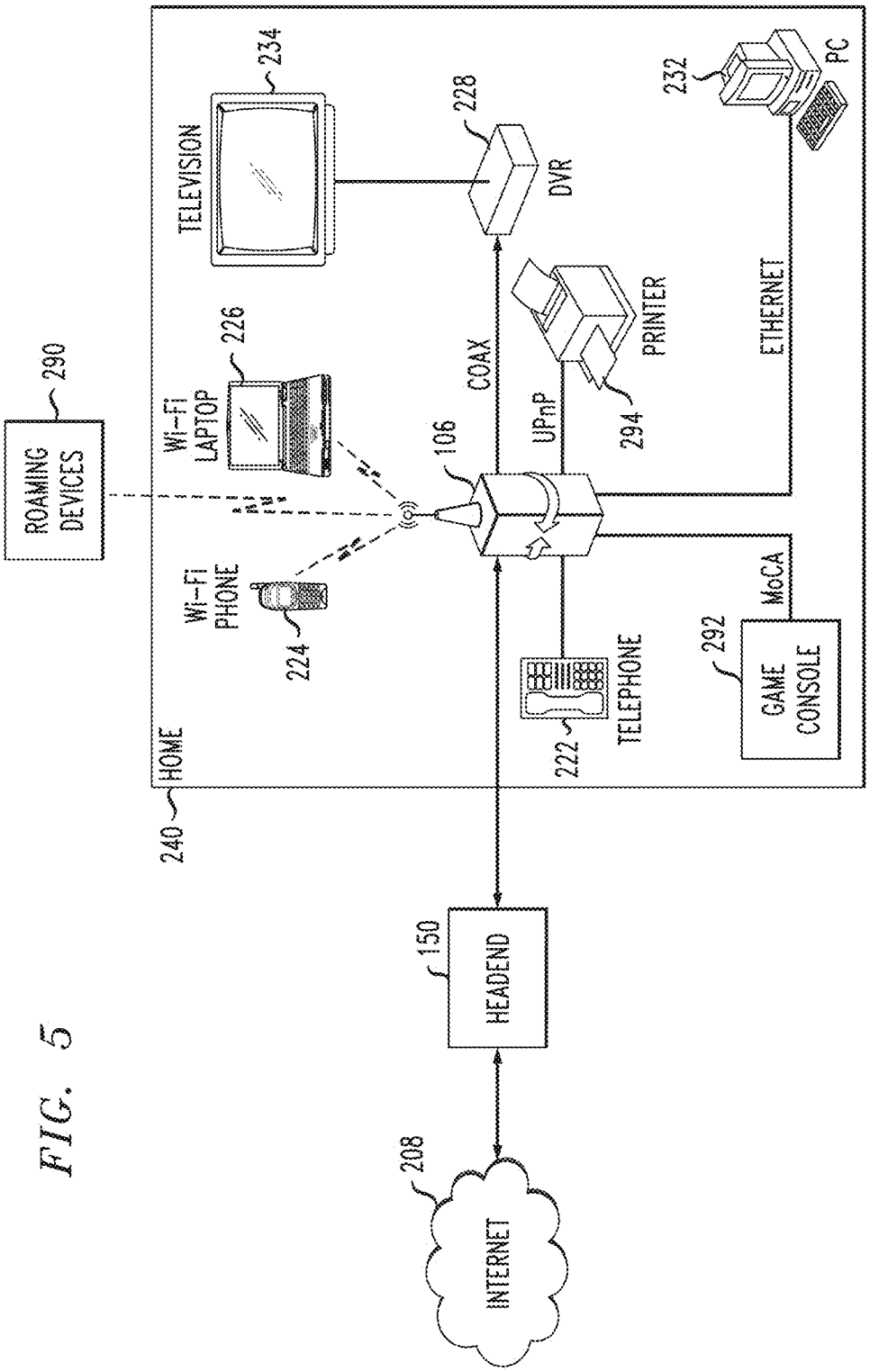
FIG. 5 is a functional block diagram of a premises network, including an exemplary centralized customer premises equipment (CPE) unit, interfacing with a head end such as that of FIG. 3.
Figure 6:
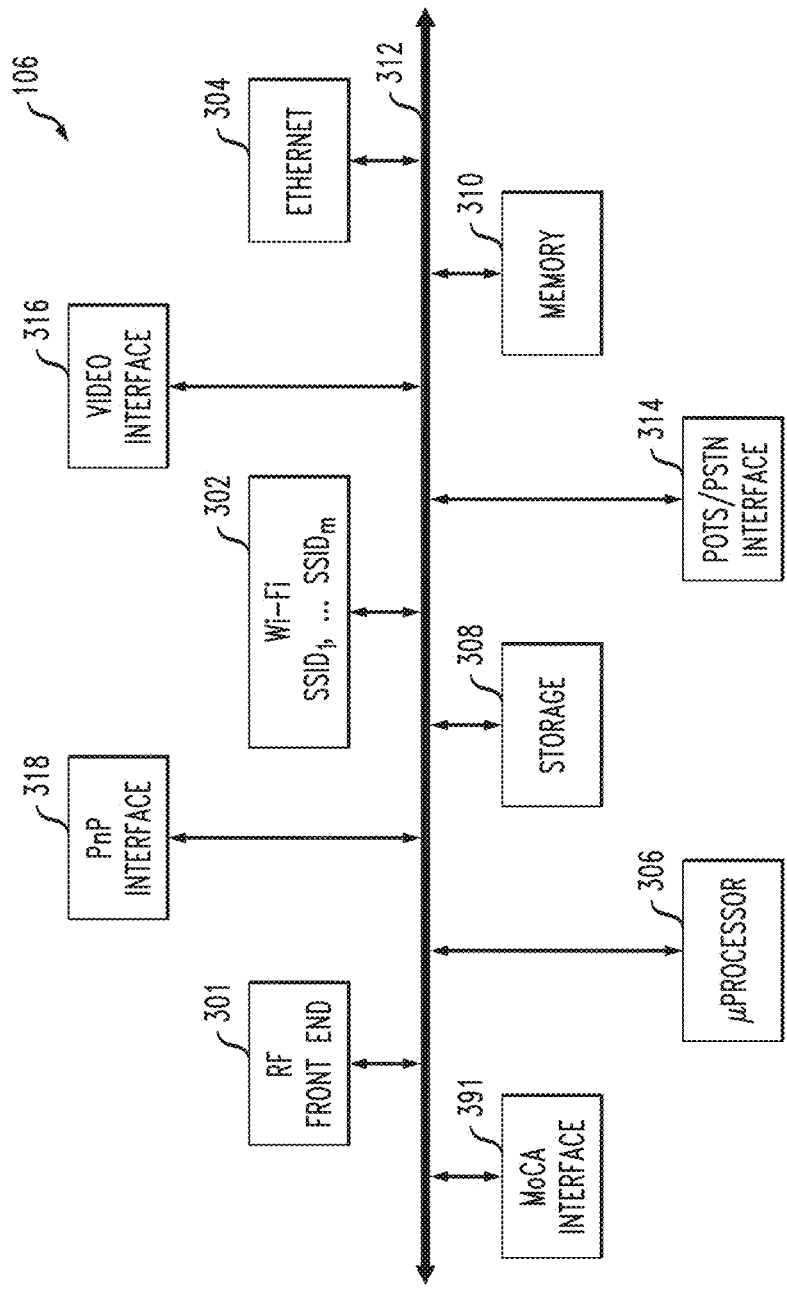
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment-see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example, over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VOIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VOIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random-access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floorstanding, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g., the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g., Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances, the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
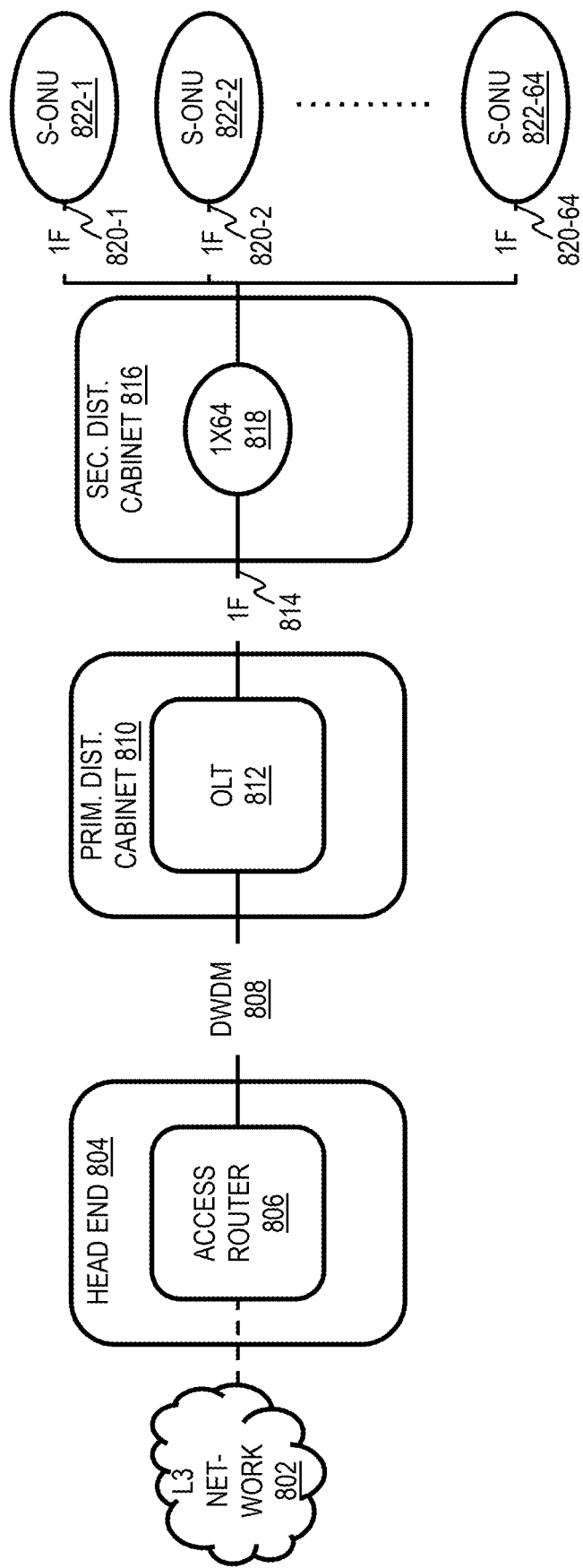
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 802 generally represents the elements in FIG. 1 upstream of the head ends 150, while head end 804, including access router 806, is an alternative form of head end that can be used in lieu of or in addition to head ends 150 in one or more embodiments. Head end 804 is suitable for FTTH implementations. Access router 806 of head end 804 is coupled to optical line terminal 812 in primary distribution cabinet 810 via dense wavelength division multiplexing (DWDM) network 808. Single fiber coupling 814 is then provided to a 1:64 splitter 818 in secondary distribution cabinet 816 which provides a 64:1 expansion to sixty-four S-ONUs 822-1 through 822-64 (in multiple premises) via sixty-four single fibers 820-1 through 820-64, it being understood that a different ratio splitter could be used in other embodiments and/or that not all of the 64 (or other number of) outlet ports are necessarily connected to an S-ONU.

Figure 9:
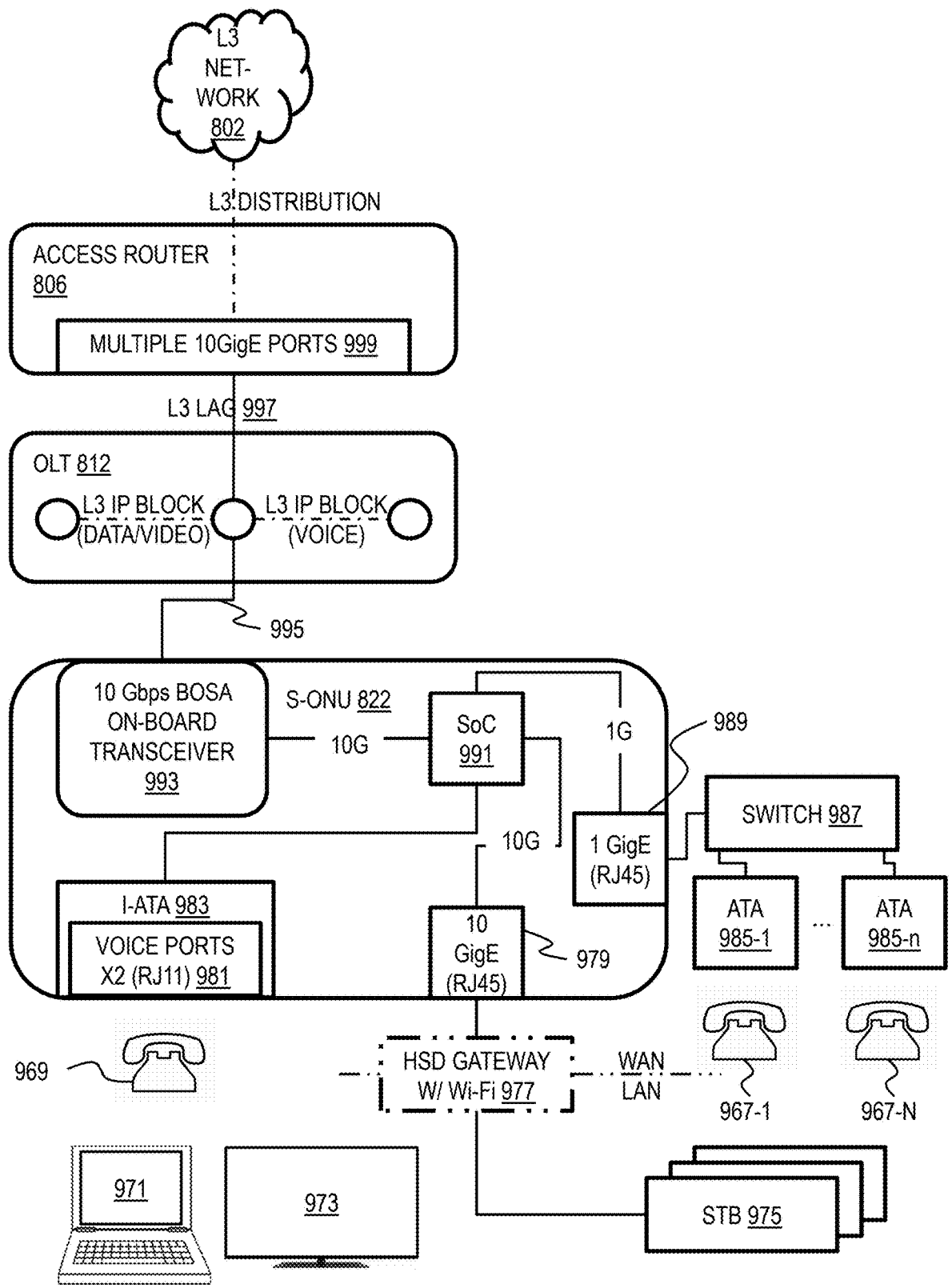
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 806 is provided with multiple ten-Gigabit Ethernet ports 999 and is coupled to OLT 812 via L3 (layer 3) link aggregation group (LAG) 997. OLT 812 can include an L3 IP block for data and video, and another L3 IP block for voice, for example. In a non-limiting example, S-ONU 822 includes a 10 Gbps bi-directional optical sub-assembly (BOSA) on-board transceiver 993 with a 10G connection to system-on-chip (SoC) 991. SoC 991 is coupled to a 10 Gigabit Ethernet RJ45 port 979, to which a high-speed data gateway 977 with Wi-Fi capability is connected via category 5E cable. Gateway 977 is coupled to one or more set-top boxes 975 via category 5e, and effectively serves as a wide area network (WAN) to local area network (LAN) gateway. Wireless and/or wired connections can be provided to devices such as laptops 971, televisions 973, and the like, in a known manner. Appropriate telephonic capability can be provided. In a non-limiting example, residential customers are provided with an internal integrated voice gateway (I-ATA or internal analog telephone adapter) 983 coupled to SoC 991, with two RJ11 voice ports 981 to which up to two analog telephones 969 can be connected. Furthermore, in a non-limiting example, business customers are further provided with a 1 Gigabit Ethernet RJ45 port 989 coupled to SoC 991, to which switch 987 is coupled via Category 5e cable. Switch 987 provides connectivity for a desired number n (typically more than two) of analog telephones 967-1 through 967-*n*, suitable for the needs of the business, via external analog telephone adapters (ATAs) 985-1 through 985-*n*. The parameter "n" in FIG. 9 is not necessarily the same as the parameter "n" in other figures, but rather generally represents a desired number of units. Connection 995 can be, for example, via SMF (single-mode optical fiber).

In addition to "broadcast" content (e.g., video programming), the systems of FIGS. 1-6, 8, and 9 can, if desired, also deliver Internet data services using the Internet protocol (IP), although other protocols and transport mechanisms of the type well known in the digital communication art may be substituted. In the systems of FIGS. 1-6, the IP packets are typically transmitted on RF channels that are different than the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve. Furthermore, one or more embodiments could be adapted to situations where a cable/fiber broadband operator provides wired broad band data connectivity but does not provide QAM-based broadcast video.

Principles of the present disclosure will be described herein in the context of apparatus, systems, and methods for coordinating cellular and cable/fiber broadband networks. It is to be appreciated, however, that the specific apparatus and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

In one non-limiting exemplary deployment model, a cable MSO places small cells inside stores or other premises. An MSO may have a network including millions of small cells. One or more embodiments provide techniques that provide cellular-side adjustments for store owners based on outages in the owners' current cable/fiber broadband connection; in some instances, to compensate the owner for placing the small cell inside the store or other premises.

Cable/fiber broadband networks typically have certain up-time probabilities, which are less than 100%, and this means there will be network outages as part of normal operation. However, some outages happen because of equipment failures, fiber issues, router/switch issues, etc. When an outage is caused by a cable operator, there is typically no incentive given to residential users. For example, if a residential user's internet connection at home is not available for 5 minutes, the cable operator will typically only text the user, telling the user that there is an outage (which the user typically already knows). However, depending on the urgency of that connection at the moment, the value of that connection to the user may be very high, and the user may desire to be compensated for the loss of connection.

One or more embodiments advantageously provide techniques that determine certain incentives for small and medium size business owners in return for placing an MSO's 5G Citizens Broadband Radio Service Device (CBSD) inside their stores. As will be appreciated by the skilled artisan, small cells are low-powered cellular radio access nodes that operate in licensed and unlicensed spectrum that have a range of 10 meters to a few kilometers. These cells are "small" compared to a mobile macrocell, partly because they have a shorter range and partly because they typically handle fewer concurrent calls or sessions. In one or more embodiments, a device on window glass inside a store or other premises is such a small cell and provides 5G services to customers inside and outside the store or other premises. For example, on a street with high rise buildings, coverage provided outside a store or other premises will serve users roaming in street. Inside the store or other premises, Wi-Fi and 5G may both be available. A Citizens Broadband Radio Service Device (CBSD) is the type of small cell used in CBRS (Citizens Broadband Radio Service); it operates in the CBRS band. A CBSD located on storefront glass can send a signal outside to the street, thus providing on-street coverage to mobile customers; a small cell can, for example, provide 5G both inside and outside the store or other premises. A "small cell" communicates with a handset on cellular (e.g., 5G frequencies) but has a lower power and is smaller in size than tower-based antennas, and has a limited range. A small cell is thus a low power, miniature, small form factor microcell/micro base station.

The following documents, and all prior and subsequent versions thereof, are expressly incorporated herein by reference in their entireties for all purposes:

Signaling Protocols and Procedures for Citizens Broadband Radio Service (CBRS): Spectrum Access System (SAS)-Citizens Broadband Radio Service Device (CBSD) Interface Technical Specification Document WINNF-TS-0016 Version V1.2.6 25 Nov. 2020

WInnForum CBRS Certificate Policy Specification Document WINNF-TS-0022 Version V1.5.0 17 Nov. 2020

Test and Certification for Citizens Broadband Radio Service (CBRS); Conformance and Performance Test Technical Specification; SAS as Unit Under Test (UUT) Document WINNF-TS-0061 Version V1.5.1 7 Oct. 2019

CBRS Communications Security Technical Specification Document WINNF-TS-0065 Version V1.3.0 17 November2020

CBRS Operational Security Document WINNF-TS-0071 Version V1.0.0 (Formerly WINNF-15-S-0071-V1.0.0) 26 Jul. 2017

Signaling Protocols and Procedures for Citizens Broadband Radio Service (CBRS): Spectrum Access System (SAS)-SAS Interface Technical Specification Document WINNF-TS-0096 Version 1.3.2 13 Mar. 2020

Requirements for Commercial Operation in the U.S. 3550-3700 MHz Citizens Broadband Radio Service Band Document WINNF-TS-0112 Version V1.9.1 13 Mar. 2020

Test and Certification for Citizens Broadband Radio Service (CBRS); Conformance and Performance Test Technical Specification; CBSD/DPas Unit Under Test (UUT) Working Document WINNF-TS-0122Version V1.0.2 25 Nov. 2020

Operations for Citizens Broadband Radio Service (CBRS): Priority Access License (PAL) Database Technical Specification Document WINNF-TS-0245 Version V1.2.0 3 Mar. 2021

CBRS Certified Professional Installer Accreditation Technical Specification Document WINNF-TS-0247Version V1.5.0 27 Oct. 2020

CBRS Operational and Functional Requirements (Release 2) Document WINNF-TS-1001 Version V1.2.0 19 November2020

Signaling Protocols and Procedures for Citizens Broadband Radio Service (CBRS): Extensions to Spectrum Access System (SAS)-Citizens Broadband Radio Service Device (CBSD) Interface Technical Specification (Release 2) Document WINNF-TS-3002 Version V1.1.1 19 Feb. 2021

Signaling Protocols and Procedures for Citizens Broadband Radio Service (CBRS): Extensions to Spectrum Access System (SAS)-SAS Interface Technical Specification (Release 2) Document WINNF-TS-3003 Version V1.1.0 30September 2020

Test and Certification for Citizens Broadband Radio Service (CBRS); Conformance and Performance Test Technical Specification; CBSD/DPas Unit Under Test (UUT) (Release 2) Document WINNF-TS-4004 Version V1.0.0 30September 2020

CBRS Release 2 Self-Testing Policy Document WINNF-TS-4005 Version V1.0.0 14 May 2020

CBSD Antenna Pattern Database Technical Specification Document WINNF-TS-5006 Version V1.0.0 29 Sep. 2020

CBRS Alliance Identifier Management: Database and User Interface Design CBRSA-TR-0102 V1.0.0 Mar. 5, 2019

CBRS Alliance Identifier Administration Guidelines for Shared HNI CBRSA-TR-0101 V1.0.0 Jan. 21, 2019

CBRS Alliance Identifier Guidelines for Shared HNI CBRSA-TR-0100 V1.0.0 Nov. 27, 2018

CBRS Network Services Use Cases and Requirements CBRSA-TS-1001 V3.0.0 18 February 2020

CBRS Network Services Stage 2 and 3 Specification CBRSA-TS-1002 V3.1.0Jun. 23, 2020

Extended Subscribers Authentication Technical Specifications CBRSA-TS-1003 V3.0.0 18 Feb. 2020

CBRS Coexistence Technical Specifications CBRSA-TS-2001 V3.1.0 17 July 2020

Figure 10:
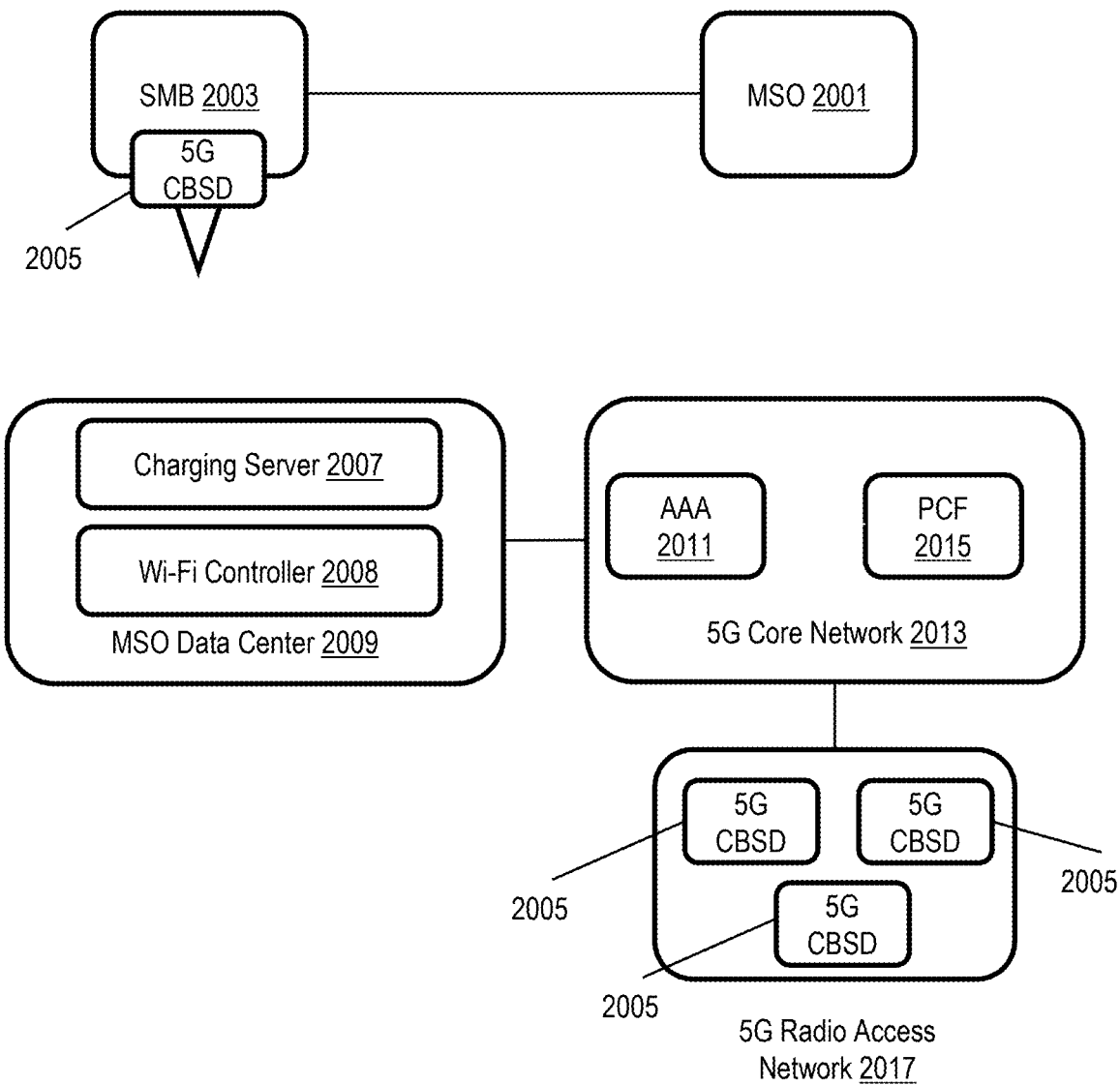
FIG. 10 is a high-level block diagram of an exemplary system, in accordance with an aspect of the invention.
Figure 11:
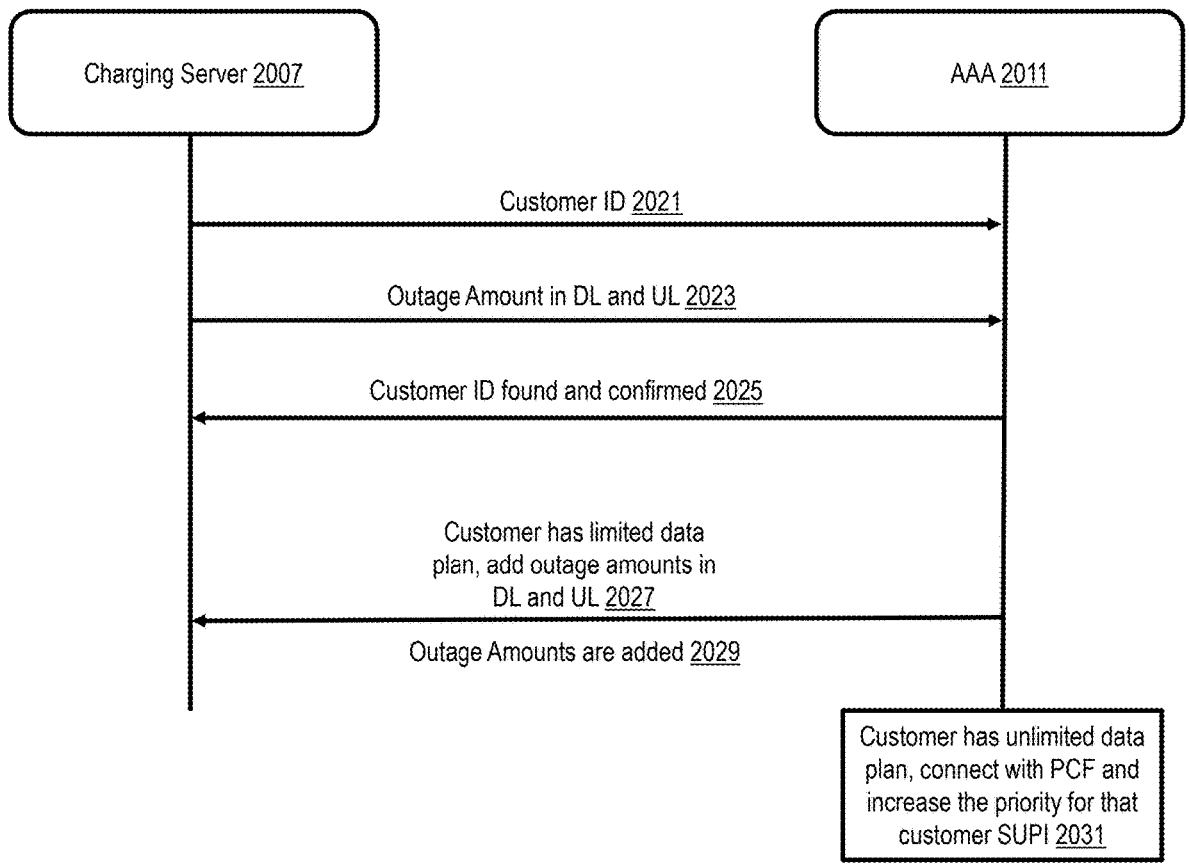
FIG. 11 is a data flow diagram, according to an aspect of the invention.

Referring to FIGS. 10 and 11, MSO 2001 determines the location of the small business SMB 2003 where it is desired to place the fifth generation (5G) Citizens Broadband Radio Service Device (CBSD) 2005. It should be noted that locations other than small businesses and equipment other than CBSDs are also contemplated. The MSO 2001 places the 5G CBSD 2005 inside the store or other premises, and signs an agreement with store owner (or other premises owner/occupant) for a connection incentive for small businesses (SMBs). MSO 2001 provides a 5G CBSD phone to the store owner. At some point, the SMB experiences an internet outage.

MSO 2001 determines the cause of the outage, and if the outage is caused by the MSO, then the incentive program kicks in; and the following items are calculated (e.g., by charging server 2007 in the MSO's data center 2009 (which can be, for example, an NDC 1098 or RDC 1048)):

Current connection package (e.g., 1 Gbps download (DL), 500 Mbps upload (UL))

Duration of the outage

Time of the outage

The incentive program on server 2007 calculates the total loss of data caused by the outage. For example, if the outage is 2 minutes (120 seconds), for 1 Gbps data speed, then 1000 Mbps*120 seconds=120 Gb or 120/8=15 MB of data is lost in the DL and 7.5 GB of UL data transmission opportunity is lost in the UL. For limited data plans, MSO 2001 adds this lost amount of data for free to the store owner's phone account. Charging server 2007 in the MSO's data center 2009 calculates the lost data in DL and UL for each outage. Charging server 2007 sends this information to the AAA server 2011 in 5G core network 2013 together with the Customer ID, as seen at 2021, 2023.

AAA server 2011 finds the account of the store owner using the Customer ID, and confirms this back to the charging server 2007 as seen at 2025. In case the customer has a limited data plan, as seen at 2027, 2029, AAA server 2011 adds additional DL and UL data amounts under the store owner's account/phone number, and the store owner receives a notification of the update. If the customer has an unlimited plan, as at 2031, AAA server 2011 notifies the PCF 2015 and changes the priority level for the customer in busy hours, or for applications the customer uses frequently. The customer receives very high speed (as compared to normal) data until 15 MB is transmitted in DL, and very high (as compared to normal) UL speeds until 7.5 MB is reached. For example, if the store owner's current data speed is 15 Mbps, then the data speed will increase to 30 Mbps, and if the store owner's UL data speed is 1 Mbps, then the UL speed will increase to 2 Mbps. In general, the customer receives a higher speed than under normal terms of service; double or triple is a non-limiting example. In one or more embodiments, both downlink and uplink speeds are increased, even to the point of multiplying by 4×, 5×, 6×, or even 10×. It may be desirable to compensate quickly for the outage, perhaps as quickly as possible, and to then return to normal operation. Note that unit 2005 shown within SMB 2003 is one of many 5G CBSD units 2005 within 5G radio access network 2017, as seen at the lower right of FIG. 10. "PCF" refers to the Policy Control Function in 5G (Policy Control Root Function in 4G), and similar functions as are contemplated for sixth generation and higher.

One or more embodiments provide a technological procedure to find service interruptions. Responsive to same, a computer work order can be generated to fix the problem and a technician can be dispatched; compensation can be provided for lost service; an incentive can be provided to a small business owner, or the like.

As discussed above, in an exemplary deployment model, a cable MSO places small cells inside stores or other premises. In some instances, these small cells are located on the glass of a storefront. This can provide coverage outside the premises as well. It may be desirable to provide an incentive for the store owner—the base station is placed inside the store on the glass and the MSO signs an agreement with the store owner. Such agreements typically have rules such as: the business owner cannot move or disconnect the base station. In return, if the store owner is not already an MSO user, the owner can be provided with one or more gift cards; if the owner is already an MSO customer, the customer can be provided with a cellular phone offered by the MSO, additional internet connection(s), etc. It is worth noting that a wireless access point or "WAP" is a term typically used in connection with Wi-Fi, as discussed above with regard to FIG. 5. Many customers have Wi-Fi routers today and small cells 106B are being provided as an additional device the customers typically do not currently have.

Cable providers typically experience occasional outages due to weather, internal issues, software (SW)/hardware (HW) issues, etc. One or more embodiments closely monitor outages, and if they are caused by the MSO, one or more embodiments find a way to compensate the business owner for the outage. One mode of compensation is to provide a certain amount of additional monthly data to the 5G phone that the user owns (assuming that such phone currently has limited monthly data). The owner may instead have an unlimited data plan (very common today), in which case the speed of the unlimited data can be increased. One or more embodiments quickly send the data lost during the outage to the user terminal (i.e., mobile phone or similar mobile device). Thus, in one or more embodiments, an outage on the cable side is quickly compensated for by a speed boost on the 5G side.

Figure 12:
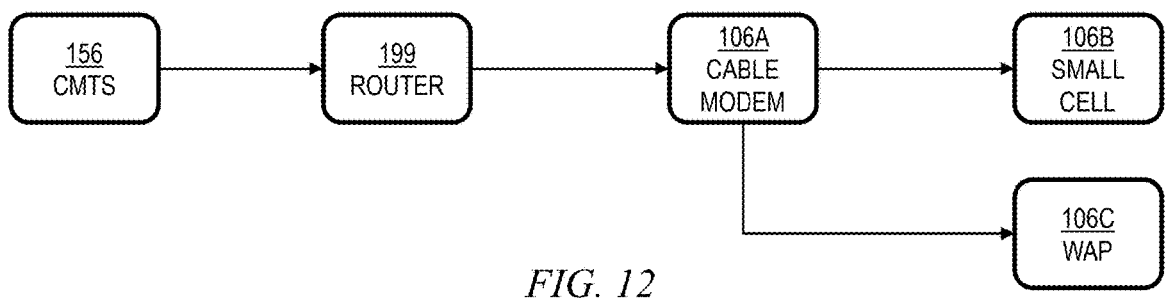
FIG. 12 is another high-level block diagram of an exemplary system, in accordance with an aspect of the invention.

Referring to FIG. 12, CMTS 156 connects to cable modem 106A. The user has an Internet connection, including one or more routers 199 connected to the cable modem 106A; the connection goes through the DOCSIS (e.g., HFC network 101 or similar broadband network such as a fiber network shown in FIGS. 8 and 9) network and reaches to the core network 2013 (the routers can be located, for example, anywhere between the CM 106A and the CMTS 156, or the analogous components in a fiber network). At the core network 2013, there are certain nodes. The 4G and 5G systems include a "Triple A (AAA)" server 2011 (AAA=authorization, authentication, and accounting). The AAA server 2011 authenticates the user from the network side, authorizes the user to use certain kinds of services, and also charges the user—for example, collecting the data regarding how much data the user has used thus far. In some instances, if the user has gone beyond a threshold, the data rate is slowed down—the AAA server informs the other nodes in the network. The AAA server does not do this by itself but rather working together with the other nodes. The store owner may, for example, have a Wi-Fi access point as discussed with regard to FIG. 5, and a small cell 106B. The Wi-Fi access point may be used as the main hub for internet connection inside the store. The Wi-Fi access point and small cell 106B can each connect to other phones, billing systems, store customers, and the like. The Wi-Fi access point is designated in FIG. 12 as 106C.

Figure 13A:
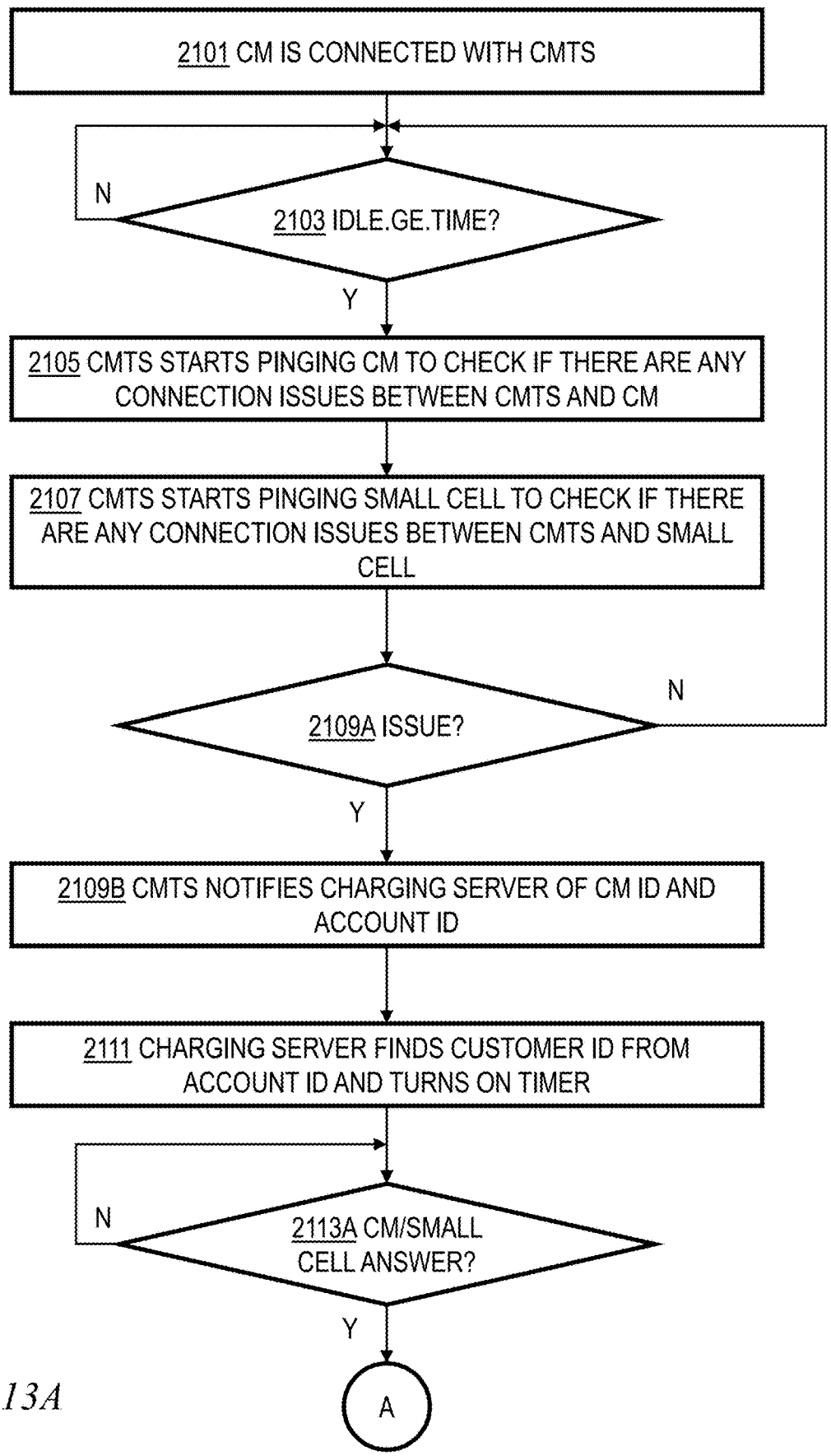
FIGS. 13A and 13B present a flow chart of an exemplary method, in accordance with an aspect of the invention.
Figure 13B:
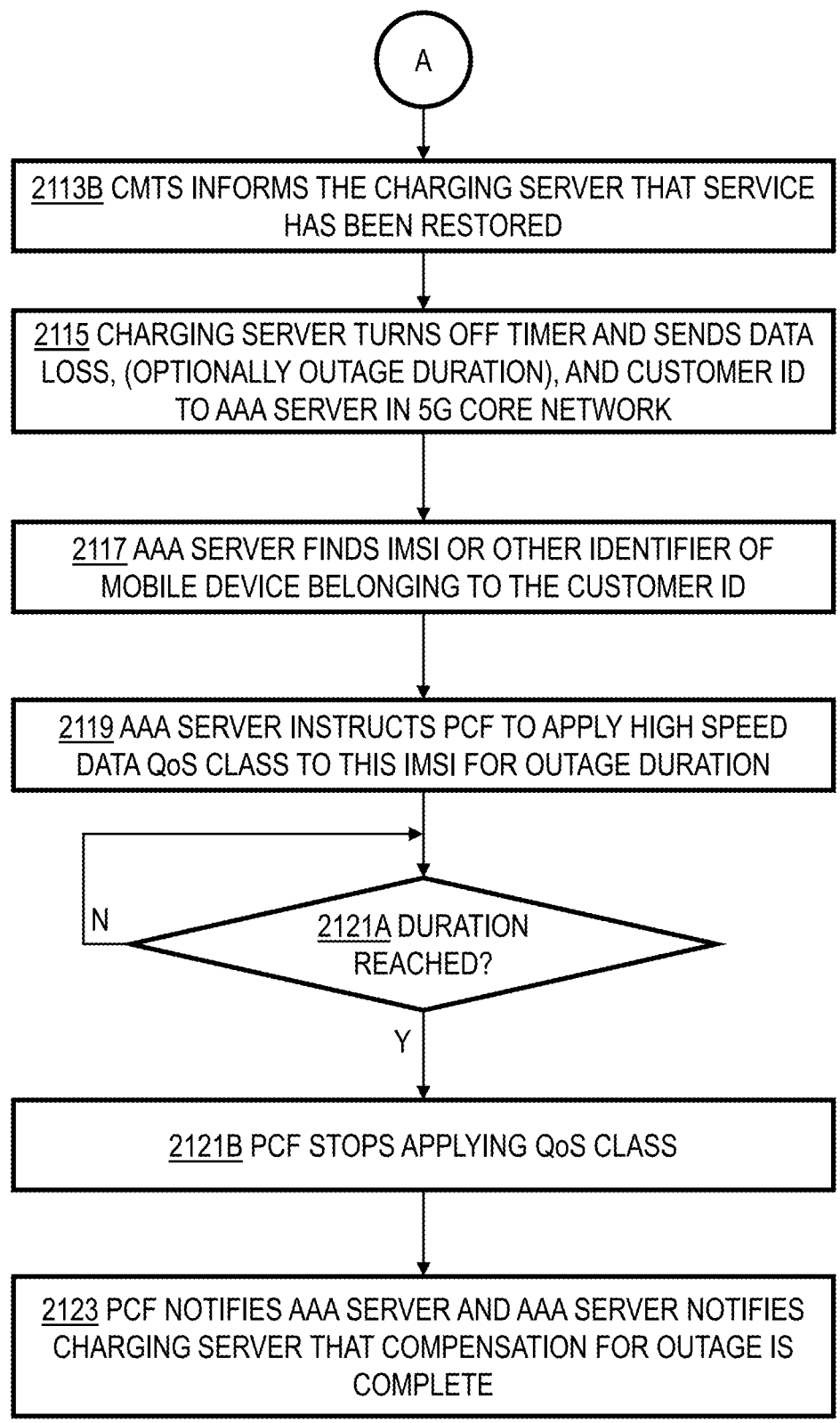

Refer to FIGS. 13A and 13B. In step 2101, cable modem 106A is connected to CMTS 156. CMTS 156 terminates all the cable modems in a given group and serves all the cable modems, like a managing hub or managing server. On the back side of the CMTS server, there is a core network/5G 2013. The small cell 106B is connected to the CM 106A. In step 2103, the CMTS 156 notices that there is no data consumption for some time (Y branch; if lack of data consumption is not seen (N branch) keep checking). Furthermore in this regard, in one or more embodiments, each small cell is connected to the CMTS by a cable modem. If no data is sent or received, the CMTS notices that the CM has been idle for a while. For example, suppose a particular CM has been consuming 10 GB of data in an hour. However, in the last ten minutes it is noticed that the downstream data consumption was 0. The CMTS notices that something is wrong as that CM is not sending or receiving any data (i.e., an outlier in data RX/TX) (RX=receive, TX=transmit). This causes the CMTS to initiate pinging in steps 2105 and 2107. As will be appreciated by the skilled artisan, the CMTS is essentially a hardware and software package that knows whether there is TX/RX with a given one of the small cells. The CMTS can identify each CM it serves; each CM has an identifier that the CMTS knows. In that way, the CMTS sends data to the particular CM. The CMTS has a look-up table that shows the number of each cable modem that it is serving. Each CM served by a given CMTS has a corresponding buffer. The CMTS may notice that the buffer associated with a certain CM has been empty or has not changed state for a predetermined time period. This predetermined time period of emptiness/inactivity is an event kicking off the ping process for the CM associated with that buffer. The time period can, for example, be user configurable based on heuristics. For example, conditional code or logic can be provided such that IF BUFFER-X is empty>Y minutes, THEN initiate ping of CM-X.

The CMTS is thus a "smart" server and can access all the CMs and monitor the traffic to all the CMs. Each CMTS serves several different customers and there can be several different service groups. The CMTS manages many aspects of the network. In step 2103 (Y branch), a CMTS notices that one customer has an interruption. The customer may have turned off or disconnected the small cell, which is not the fault of the MSO. Alternatively, there is some kind of problem with the MSO's plant; e.g., the cable modem is broken, the cable is cut, or the like. In step 2105, the CMTS starts pinging the CM to see if there are connection issues between the CMTS and the CM. As seen in step 2107, the CMTS can also ping the small cell. Thus, in steps 2105, 2107, it is desired to locate any outage. There are two main links between the CMTS and the small cell, namely, between the CMTS and CM, and between the CM and small cell. If the CMTS pings the CM and the ping goes through, then there is no issue on that portion of the link. If the CMTS pings the small cell associated with that CM and the ping does not go through, then the problem can be isolated as being between the CM and the small cell. In one or more embodiments, there are thus, in fact, two separate steps, one to make sure the CMTS-CM connection is OK and one to make sure the CM-small cell connection is OK. Thus, the pinging mechanism determines whether any part of the network belonging to the MSO is not functioning properly.

As seen in step 2109A, if there is not a connection issue (N branch) go back and keep checking for an idle condition. If there is a connection issue (Y branch), then in step 2109B, the CMTS will send a notification to the charging server with the cable modem (CM) identifier (ID), and the account ID. The ID of the small cell can optionally be provided for troubleshooting purposes but is not needed for purposes of compensating the store owner/speed matching. The Customer ID can be determined from the account ID. There are typically many service groups. Customer IDS may not be directly visible in some instances due to security but can be determined by the AAA server 2011 based on the account ID. By just looking at the account ID one typically cannot tell which customers are connected to a given CM. The account ID is typically known/visible to the CM 106A and the CMTS 156. There is also a charging server 2007 behind the CMTS 156 in the data center. The charging server updates the AAA server 2011 (which includes a large database) re data amounts, limits, thresholds, and optionally speed. In embodiments where the cellular-side service enhancements are provided as an incentive to a store owner, the charging server can also update the AAA server regarding whether the customer employs a postpaid card, prepaid card, is a roaming user, etc. In one or more embodiments, the AAA server 2011, because of security issues, does not update this information by itself. In one or more embodiments, the AAA server is a read only server, and one or more aspects of the invention do not make any changes to the AAA. Visibility into all servers including the AAA and the charging may be provided to employees based on their job responsibilities. However, in one or more embodiments, regardless of who accesses the server, the customer data is not visible, but is encoded. By just looking at someone's ID, an employee cannot tell who he or she actually is. In step 2111, the charging server finds the customer ID from the account ID and turns on a timer to estimate the duration of the outage. Referring to 2113A, during this process, the CMTS keeps pinging the customer (CM and small cell); when the CMTS ping is again answered (Y branch; else via N branch keep checking), the CMTS informs the charging server that service has been restored in step 2113B. In step 2115, the charging server turns off the timer and determines the type of outage and the duration of the outage, as well as the data loss during the outage. Suppose a coffee shop purchases a "premier" service from an MSO, including 1 Gbps downlink and 500 Mbps uplink. Just a few minutes of outage for such a "premier" user may represent a significant amount of lost data. One or more embodiments calculate the amount of data lost due to the outage and record it in the charging server. The charging server sends the outage information and customer ID to the AAA server.

In one or more embodiments, small cell 106B is connected to CM 106A, and CM 106A is connected to CMTS 156. CMTS 156 is located in a data center, for example, or other location as discussed elsewhere herein. In the same data center or a nearby data center, the charging server 2007 is located. The CMTS is connected to the charging server. The charging server 2007 communicates with the AAA server 2011. The AAA server 2011 is used by 4G and 5G Wi-Fi networks. The AAA server 2011 can also be thought of as part of the 5G core 2013 because 5G nodes use permissions available in the AAA server. The AAA server is known per se in mobile and cable networks. The AAA server is, in essence, a node in the middle serving other networks.

Thus, by way of review, an outage has been detected, a timer has been started in the charging server, and the CMTS continues to ping the modem and small cell to check for restoration of service. The timer is stopped once the ping is again returned, and the data loss during the outage is calculated. The data loss, outage duration (optionally), and customer ID are sent to the AAA server in the 5G core network, in step 2115. It should be noted that as used herein, the Account II) is the ID used for charging by the charging server 2007. For example, a cable provider provides internet service at a home—the cable provider typically only knows the resident by the Account ID. A lookup table from Customer ID to Account ID is normally available. Thus, from the Account ID it is possible to look up the Customer ID. The Account ID is typically publicly visible and may appear on a receipt, in an e-mail, etc. On the other hand, the Customer ID is unique and defines the customer; in particular, in one or more embodiments, it defines phone number, devices, owned, etc. The Account ID and Customer ID can be numeric or alphanumeric, for example. With the Customer ID it is possible to access the AAA server and find the IMSI (discussed further below) or other identifier of the phone/handset the customer is carrying and the phone number.

By way of further example, in one or more embodiments, if a customer moves from Point A to Point B, the account ID for Point A does not change—the new resident at Point A will have the same account ID but the account ID to customer ID translation will change. Thus, the Account ID is location-centric and used for charging while the Customer ID is used for identifying the particular customer. The AAA server has customer-specific information including address, zip code, emergency information, and the like. In step 2117, the AAA server matches the customer ID to the IMSI (International Mobile Subscriber Identity), IMEI (International Mobile Equipment Identity), ICCID (Integrated Circuit Card ID), or other unique identifier) of the customer's mobile device (which phone/device may have been provided to the store owner as an incentive to put the base station inside the store). IMSI and IMEI are typically used for 4G and 5G wireless systems; phones or other cellular-capable devices has IMSI and/or IMEI numbers that uniquely ID the subscriber/phone. Now, a data triplet of IMSI, duration of outage, and amount of data lost is available. The amount of data lost can be found by multiplying the outage duration by the downlink/uplink speed. The AAA server does not need to know the outage duration. However, the AAA server is the main database to hold QoS and customer details. The AAA server does not carry out charging; this is done by the charging server. The AAA server only needs the IMSI or other identifier plus the amount of data lost-not the duration. However, although redundant, the AAA server can be provided with the duration if desired. In one or more embodiments, the charging server calculates the amount of data lost based on the speed and duration. In one or more embodiments, the AAA server is just a database and does not itself have any authorization to do anything in the network. The AAA server contacts the PCF 2015. It is not yet known what the PCF functionality will be called in 6G (or higher); however, it can be thought of generically as any node controlling the policies and functions in the network. In step 2119, the AAA instructs the PCF to apply a high-speed data QoS (quality of service) class to the given IMSI or other identifier for the outage duration. As per steps 2121A and 2121B, the PCF node applies a high QoS/speed to the corresponding IMSI or other identifier for the outage duration (i.e., while block 2121A yields a "NO"), and then stops when block 2121A yields a YES as per step 2121B. In step 2123, the PCF advises the AAA, and the AAA advises the charging server that compensation is complete.

It is worth noting that the Cable modem ID is a unique hardware/chassis ID for the cable modem and a similar ID is available for the S-ONU in fiber systems. It is also worth noting that in addition to speed, mobile QoS could include factors such as calls lost (e.g., when transitioning between cells), voice quality, number of calls that cannot be completed, and the like.

Data flows between the cable/fiber broadband and mobile/cellular worlds are useful in a variety of contexts, and can also be used, for example, to speed-adjust services. Suppose an MSO serves a Wi-Fi access point in premises with a 1 Gbps downlink. The Wi-Fi access point uses that bandwidth to share with 100 users. Dividing 1 Gbps by 100 users, each user has 10 Mbps Wi-Fi inside the store. Customers may be leaving and going outside, but it may be desirable to still provide service. In some instances, the customers can connect to a 5G service that the store subscribes to and 10 Mbps can still be provided vis cellular service outside the store. For this reason, it is desirable in one or more embodiments for the store owner to work with an MSO or similar cable/fiber broadband provider that owns both a cable/fiber broadband network and a 5G (or other cellular) network. One or more embodiments can thus be used for matching speeds of cable/fiber broadband and cellular networks. One or more embodiments thus improve the technological process of interfacing back-end functions of cable/fiber broadband network with a 5G/6G cellular network.

It is worth noting that terms such as narrowband/broadband refer to network speed. HFC and fiber can support data rates on the order of Gbps and thus are broadband. A distinction should be made between a broadband cable/fiber connection and broadband wireless/cellular connection. Broadband cable fiber is used herein to refer to a primarily wired network using coaxial cable and/or fiber optic cable, such as shown in FIGS. 1-9.

As used herein, a cellular network or mobile network is a communication network where the last link is wireless, distributed over land areas called "cells," each served by one or more fixed-location transceivers that provide the cell with the network coverage which can be used for transmission of voice, data, and other types of content.

As used herein, Wi-Fi is a family of wireless network protocols, based on the IEEE 802.11 family of standards, which are commonly used for local area networking of devices and Internet access. As used herein, a wireless access point (WAP) is a networking hardware device that allows other Wi-Fi devices to connect to a wired network. A WAP is thus distinguished from a small cell in that the latter operates on cellular frequencies according to cellular protocols while the former operates in accordance with the IEEE 802.11 family of standards.

As used herein, 4G is the fourth generation of broadband cellular network technology, succeeding 3G, and preceding 5G (a 4G system must provide capabilities defined by ITU in IMT Advanced); 5G is the fifth generation technology standard for broadband cellular networks, which cellular phone companies began deploying worldwide in 2019, and is the planned successor to the 4G networks which provide connectivity to most current cellphones; and 6G is the sixth generation standard currently under development for wireless communications technologies supporting cellular data networks.

Given the discussion thus far, it will be appreciated that, in general terms, an exemplary method, according to an aspect of the invention, includes the step of detecting, at a cable/fiber broadband network termination unit (e.g., cable modem termination system 156 or access router 806) of a cable/fiber broadband (e.g., HFC or fiber) multi-service operator, an interruption in service to a cable/fiber broadband network customer unit (e.g., cable modem 106A or S-ONU 822)-small cell 106B pair. The small cell could be a unit 2005, for example. Refer, for example, to steps 2103-2109A for detecting an interruption. A further step 2109B includes, responsive to detecting the interruption, the cable/fiber broadband network termination unit advising a charging server 2007 of the cable/fiber broadband multi-service operator of the interruption in service, a corresponding identifier of the cable/fiber broadband network customer unit-small cell pair (e.g., cable modem ID), and a corresponding account identifier (for example, the cable/fiber broadband network customer unit identifier can be used to determine the amount of service interruption, and the account identifier can be used to identify the account of the subscribers which will be compensated for the service interruption). Still a further step 2115 includes, responsive to the cable/fiber broadband network termination unit advising the charging server, the charging server 2007 of the broadband cable/fiber multi-service operator advising a backend server (e.g., an authorization, authentication, and accounting (AAA) server 2011) of an associated cellular network 2017 (e.g., 4G/5G/6G or other) of a customer identifier corresponding to the account identifier (e.g., customer identifier of premises owner or someone on the premises who lost data) (and optionally, of characteristics of the interruption in service, such as, for example, delay, download and/or upload throughput, data loss, and or any combination and/or sub combination thereof). An even further step 2119 includes, responsive to the charging server advising the backend server, the backend server 2011 of the associated cellular network advising a policy control function 2015 of the associated cellular network to modify network parameters of the associated cellular network to compensate for the interruption in service. Note that the backend server, such as AAAA server 2011, can also be referred to as a 'backend node' or 'core network node.' Note that the "interruption" in service could be a complete stoppage or a speed/quality degradation, for example.

One or more embodiments further include operating the associated cellular network in accordance with the modified network parameters. For example, operate the cellular network with the enhanced QoS as described herein. This can be done, for example, until the duration of the outage is reached (Y branch of block 2121A to 2121B).

In one or more embodiments the detecting includes the cable/fiber broadband network termination unit determining that the cable/fiber broadband network customer unit-small cell pair has not consumed data for a predetermined time period (Y branch of decision block 2103); responsive to the determining, the cable/fiber broadband network termination unit initiating a periodic ping of the cable/fiber broadband network customer unit-small cell pair (steps 2105, 2107); and, responsive to the periodic ping not being returned, concluding that the interruption in service has occurred (Y branch of 2109A). Note that while block 2109A is simplified in the sense of just determining whether there is an issue, as noted elsewhere, for diagnostic purposes it can be determined whether the problem is between the cable/fiber broadband network termination unit and the cable/fiber broadband network customer unit, or between the cable/fiber broadband network customer unit and the small cell. One or more embodiments can also implement a computer-generated work order responsive to the Y branch of block 2109A and/or dispatch a technician to address the issue.

In one or more embodiments, responsive to the cable/fiber broadband network termination unit advising the charging server of the interruption, in step 2111, the charging server turns on a timer. Further steps include, at 2113A, the cable/fiber broadband network termination unit continuing the periodic ping of the b cable/fiber broadband network customer unit-small cell pair until the cable/fiber broadband network customer unit-small cell pair responds; at step 2113B, the cable/fiber broadband network termination unit advising the charging server when the cable/fiber broadband network customer unit-small cell pair responds; and, at step 2115, responsive to the cable/fiber broadband network termination unit advising the charging server when the cable/fiber broadband network customer unit-small cell pair responds, the charging system turning off the timer.

One or more embodiments further include the charging server determining a current upload/download speed associated with the cable/fiber broadband network customer unit-small cell pair; and the charging server calculating a data loss associated with the interruption in service, based on the current upload/download speed and the duration of the timer. A further step includes, responsive to the cable/fiber broadband network termination unit advising the charging server, the charging server of the cable/fiber broadband multi-service operator advising the backend server of the associated cellular network of characteristics of the interruption in service, the characteristics including at least the data loss.

One or more embodiments further include the backend server of the associated cellular network determining a unique identifier (e.g., ICCID, IMSI, IMEI, or the like) associated with a mobile device that is associated with the account identifier and utilizes the cellular network. Note that elements 224, 290 in FIG. 5 are representative of devices that could also have 5G small cell connectivity in accordance with one or more embodiments. In some instances, the modifying of the network parameters includes adding more data for the mobile device, based on the unique identifier (e.g., in case of a limited data plan); in other instances, the modifying of the network parameters includes changing a quality of service for the mobile device, based on the unique identifier (e.g., if unlimited data plan).

It will be appreciated that in some instances, in the detecting step, the cable/fiber broadband network termination unit includes a cable modem termination system and the cable/fiber broadband network customer unit includes a cable modem; in other instances, in the detecting step, the cable/fiber broadband network termination unit includes an access router and the cable/fiber broadband network customer unit includes a service optical network unit (S-ONU).

In one or more embodiments, an MSO or other broadband network operator also controls the cellular network and all the pertinent components are under the control of same entity.

In another aspect, an exemplary system includes a cable/fiber broadband network customer unit (e.g., cable modem 106A or S-ONU 822)-small cell 106B pair; a cable/fiber broadband network termination unit (e.g., cable modem termination system 156 or access router 806) of a cable/fiber broadband (e.g., HFC or fiber) multi-service operator, coupled to the cable/fiber broadband network customer unit-small cell pair; a charging server 2007 of the cable/fiber broadband multi-service operator, coupled to the cable/fiber broadband network termination unit; a backend server (e.g., an authorization, authentication, and accounting server 2011) of a cellular network 2013 associated with the cable/fiber broadband multi-service operator, coupled to the charging server; and a policy control function server 2015 of the associated cellular network, coupled to the backend server. The elements are configured (e.g., by software or firmware executing on processors thereof) to implement one, some, or all of the method steps above described.

Figure 14:
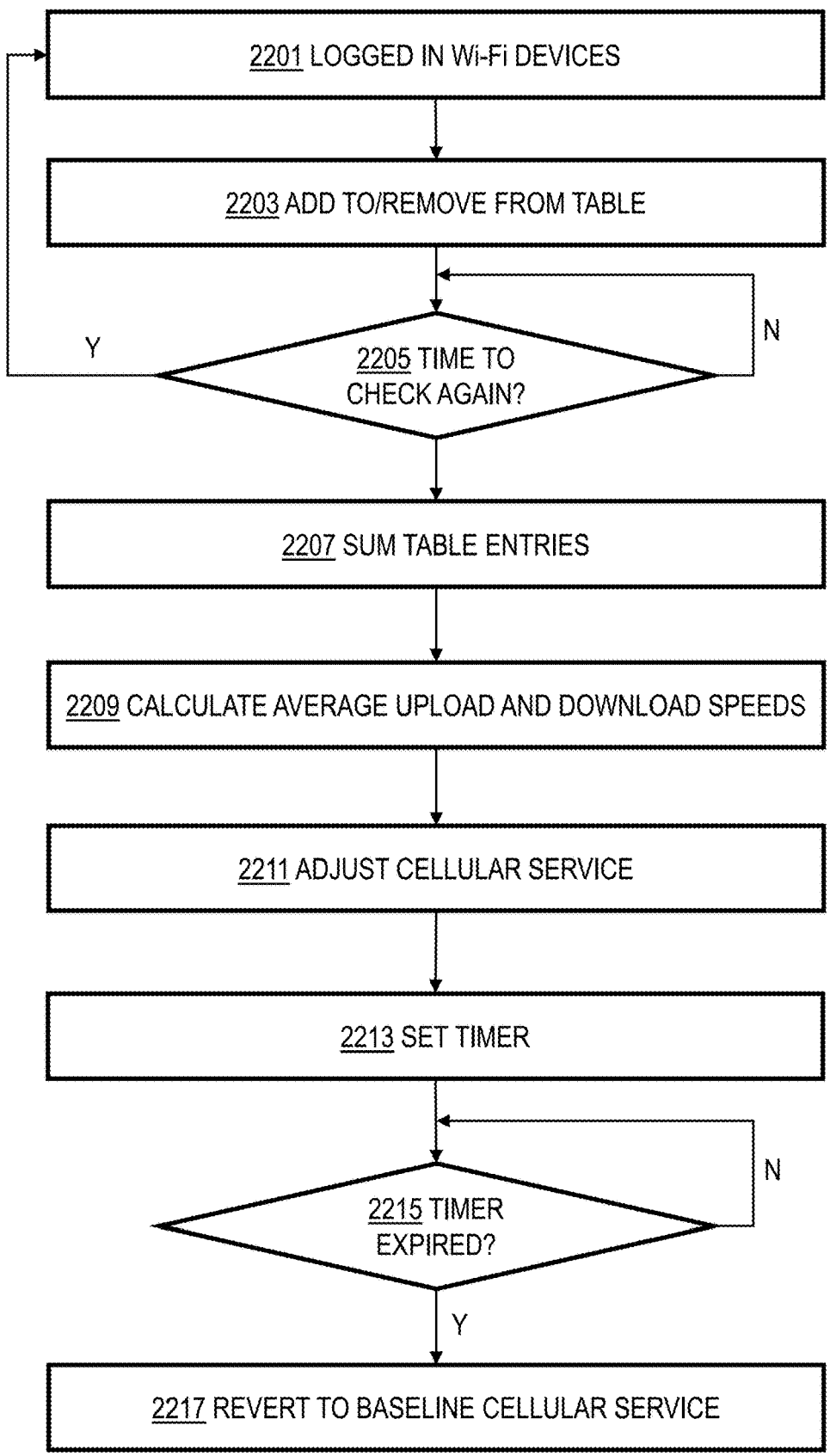
FIG. 14 presents a flow chart of another exemplary method, in accordance with another aspect of the invention.

Furthermore, given the discussion thus far, and referring to FIG. 14, it will be appreciated that, in general terms, another exemplary method, according to another aspect of the invention, includes the step of determining a number of Wi-Fi enabled devices present in association with premises having Wi-Fi connectivity to a cable/fiber broadband network that also provides cellular service (i.e., the operator of the cable/fiber broadband network also operates a cellular network linked to the cable/fiber broadband network using techniques such as those disclosed herein; the cable/fiber broadband network physical plant does not itself provide cellular service). For example, this step can be carried out at a Wi-Fi WAP (see, e.g., FIGS. 5 and 106C in FIG. 12) coupled to an upstream Wi-Fi Controller 2008 via a cable modem 106A. In a non-limiting example, in step 2201 logged in Wi-Fi devices are noted and added to a table in step 2203 (or entries for departed device are removed). This is done periodically as indicated by decision block 2205. The table entries are summed in step 2207.

A further step 2209 includes calculating an average Wi-Fi speed per handset by dividing an overall data rate associated with the premises by the number of wireless handsets present (e.g., determined in step 2207 wherein the table entries are summed). This step can be carried out, for example, at the Wi-Fi Controller 2008. As discussed elsewhere herein, the speed can be determined for both upload and download. Furthermore, in one or more embodiments, based on the speed and the number of customers in the store, the average throughput/speed per customer can be calculated. That number can be used to match the cellular (e.g., 5G) speed. For example, suppose a store owner has 1 Gbps cable and it is known that there are 100 users connected to a WAP in the store. Each user therefore has a 10 Mbps Wi-Fi speed, and, for example, this speed can be matched on the 5G side. An even further step 2211 includes, for those of the Wi-Fi enabled devices corresponding to customers of the cable/fiber broadband network, adjusting corresponding cellular service to corresponding ones of the customers based on the average Wi-Fi speed. For example, the Wi-Fi Controller 2008 messages the backend server, and the backend server 2011 messages the PCF 2015 to change speed/QoS. In one or more embodiments, for those who are not customers of the cable/fiber broadband network, it will still be known that they are connected and that information can be used to find the average data rate, but speed/QoS adjustment on the 5G side is carried out only for those who are customers of the cable/fiber broadband network. This aspect could also be done responsive to a service outage on the Wi-Fi side in which case the speed(s) matched would be those before the outage.

As noted, in one or more embodiments, calculating the average Wi-Fi speed includes calculating an average Wi-Fi upload speed and an average Wi-Fi download speed; for example, at Wi-Fi Controller 2008.

In one or more embodiments, adjusting the corresponding cellular service includes at least matching the average Wi-Fi speed with the cellular service (in cases where upload and download speeds are determined, adjusting the corresponding cellular service includes at least matching the average Wi-Fi upload speed and the average Wi-Fi download speed with the cellular service). For example, the Wi-Fi Controller 2008 messages the backend server, and the backend server messages the PCF 2015 to at least match the average speed.

One or more embodiments further include operating the adjusted cellular service; for example, in accordance with modified network parameters regarding speed (e.g., speed matching) or enhanced QoS. This can be done, for example, for a predetermined time period; i.e., stopping the adjusting after a predetermined time period. For example, the Wi-Fi Controller 2008 can set a configurable timer (see step 2213) when the enhanced service is started and maintain the enhanced service for a pre-configured time (by way of example and not limitation, several hours). In this aspect, the enhanced service is maintained for a certain time regardless of handset location (e.g., keep checking as per NO branch of decision block 2215 until timer expires in Y branch and reversion to normal service takes place in step 2217). Other criteria could be used in other embodiments to determine when to revert to normal service; for example, when the handset/device is no longer in range of the Wi-Fi network, when the handset/device's identifier is no longer on the list/table; or based on other user-defined parameters.

In one or more embodiments, determining the number of the Wi-Fi enabled devices present in association with the premises includes summing a number of users logged in to the Wi-Fi connectivity with network-provided credentials and a number of users logged in to the Wi-Fi connectivity with premises-provided credentials; and the step of, for those of the Wi-Fi enabled devices corresponding to the customers of the cable/fiber broadband network, adjusting the corresponding cellular service to the corresponding ones of the customers based on the average Wi-Fi speed, includes identifying cellular devices of the users logged in to the Wi-Fi connectivity with the network-provided credentials, based on the network-provided credentials. Summing can be done, for example, at the WAP coupled to the CM 106A or at an upstream server such as Wi-Fi Controller 2008. Newly present devices can be reflected in the table in step 2203, and departure of devices that have left the vicinity can be also be reflected in the table in step 2203; the check of devices present can be carried out periodically as indicated by decision block 2205 and the corresponding yes and no branches. In one or more embodiments, the duration of the enhanced cellular service is based on the timer, regardless of whether the particular device is still reflected in the table of devices present in proximity to the Wi-Fi.

Furthermore in this regard, the entity that operates the cable/fiber broadband network and the associated cellular network knows where its subscribers use its Wi-Fi network, since subscribers will login (e.g., in the store or other premises) using their own credentials (home or business internet account credentials assigned by the entity). If the Wi-Fi user is not a cable/fiber broadband network subscriber, then the user will not typically have any login credentials that can be used by the operator to identify this user. For instance, if the user an ACME cable/fiber broadband network subscriber at home/business, but the user receives the mobile service from BETA, then ACME cannot tell BETA to match the speed. In any event, if the Wi-Fi user is not a cable/fiber broadband network subscriber, she or he can still log into the cable/fiber broadband network using credentials (username and password) provided by the store owner. For example, the store owner (or owner/occupant of other premises) can have one common, public, username and password (for example, username: user1, password: user1) where non-subscribing users can use to log into the Wi-Fi network. In this aspect, all users logging into the Wi-Fi network with username: user1, password: user1, are non-subscriber users and they can be detected in this manner at logon for purposes of reflecting their presence in the list/table. Users who are subscribers having internet service at home provided by the entity that operates the cable/fiber broadband network and the associated cellular network, can login to the store (or other premises) Wi-Fi using their individual user name and password that they use to log in to their account at the website of the entity. The Wi-Fi controller will have the unique ID of the Wi-Fi device attached to that login information which represents the unique subscriber. The Wi-Fi speed and cable/fiber broadband network speed can thus be readily matched for subscribers, via lookup based on the individualized login information used in the store or other premises. Presence of the non-subscribers can be detected when they log in using the store-assigned credentials, as will be appreciated by the skilled artisan given the teachings herein. However, there will typically not be sufficient information to speed-match for these non-subscribers. One or more embodiments are thus of particular use for an entity that operates both a cable-fiber broadband network and an associate cellular network, and its subscribers.

In general, steps 2201-2209 can be cooperatively carried out by the WAP and the Wi-Fi controller 2008, with functionality on either or divided between the two. Step 2211 can be carried out by the controller 2008 messaging the AAA server 2011 to instruct the PCF 2015. Timer steps 2213, 2215 could be implemented in several places-in the cell network or on the Wi-Fi controller with messaging to the AAA server. One controller 2008 typically controls multiple WAPs and each WAP typically serves multiple users. The Wi-Fi controller 2008 communicates with the core network 2013 similar to server 2007. In one or more embodiments, the WAP IDs the devices, keeps a local table, and adds/subtracts entries; the table can also be present on server 2008, which can carry out the speed calculations. In one or more embodiments, one or more of the users logged into the Wi-Fi are customers of the MSO that provides both the cable/fiber broadband and cellular service. The MSO will typically be aware of the devices (e.g., phones, laptops, tablets) the user owns. If a device is cellular-capable, it will have a SIM card issued by the MSO, who will know the ID of each mobile device owned by a user with an MSO-issued SIM card. If the device is a non-cellular-capable laptop, but Wi-Fi capable, the laptop has a hardware ID and it can be determined what MSO user it belongs to. This User ID is unique across the network and can also be used to determine that a corresponding cell phone (to be given enhanced speed/service) is registered. In one or more embodiments, the users will log in when obtaining access at the WAP, entering a user name and password; the username and password allow looking up devices/accounts in the back end. The device identifier can also be included in the login data. The login data can be used to query the back end to find the cell phone and adjust its speed using techniques similar to those described with respect to FIGS. 13A and 13B.

In another aspect, an exemplary system includes a cable/fiber broadband network Wi-Fi access point 106C; a cable/fiber broadband network Wi-Fi controller 2008 of a cable/fiber broadband multi-service operator, coupled to the cable/fiber broadband network Wi-Fi access point; a backend server (e.g., an authorization, authentication, and accounting server 2011) of a cellular network associated with the cable/fiber broadband multi-service operator, coupled to the Wi-Fi controller; and a policy control function server 2015 of the associated cellular network, coupled to the backend server. The elements are configured (e.g., by software or firmware executing on processors thereof) to implement one, some, or all of the method steps above described. For example, the Wi-Fi access point and the Wi-Fi controller are cooperatively configured to: determine a number of user's Wi-Fi enabled devices present in association with premises having Wi-Fi connectivity to a cable/fiber broadband network that also provides cellular service; and calculate an average Wi-Fi speed per Wi-Fi enabled device by dividing an overall data rate associated with the premises by the number of Wi-Fi enabled devices present. Furthermore, the Wi-Fi controller, the backend server, and the policy control function server are cooperatively configured to, for those of the Wi-Fi enabled devices corresponding to customers of the cable/fiber broadband network, adjust corresponding cellular service to corresponding ones of the customers based on the average Wi-Fi speed.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine-readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

Figure 7:
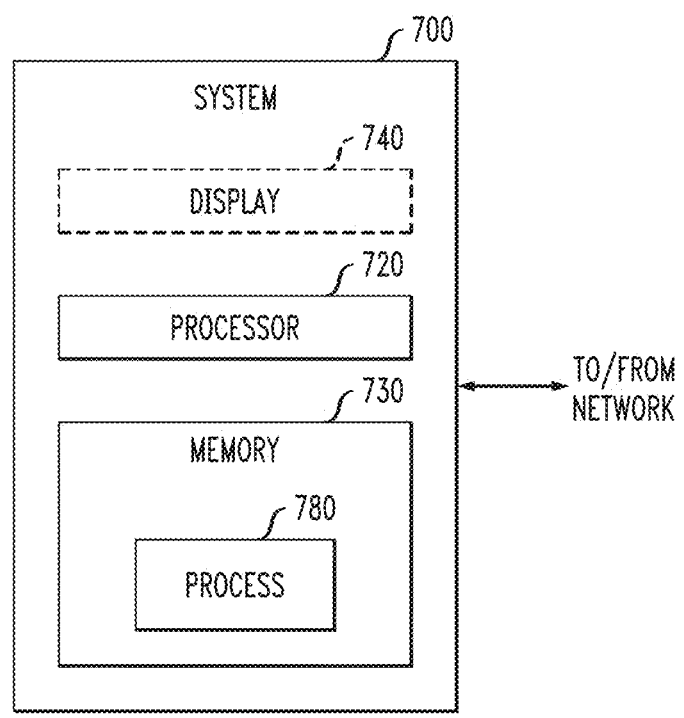
FIG. 7 is a block diagram of a computer system useful in connection with one or more aspects of the invention.

FIG. 7 is a block diagram of at least a portion of an exemplary system 700 that can be configured to implement at least some aspects of the invention, and is representative, for example, of one or more of the apparatuses, servers, or modules shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors, either concurrently (i.e., in parallel) or sequentially (i.e., in series).

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC rather than using firmware. Display 740 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information. Note that servers and routers can be virtualized instead of being physical devices (although there is still underlying hardware in the case of virtualization).

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
    determining a number of Wi-Fi enabled devices present in association with premises having Wi-Fi connectivity to a cable/fiber broadband network, wherein an operator of the cable/fiber broadband network also offers cellular service;
    calculating an average Wi-Fi speed per Wi-Fi enabled device by dividing an overall data rate associated with said premises by said number of Wi-Fi enabled devices present in association with the premises having the Wi-Fi connectivity to the cable/fiber broadband network;
    determining those of said Wi-Fi enabled devices corresponding to customers of said cable/fiber broadband network; and
    for those of said Wi-Fi enabled devices corresponding to said customers of said cable/fiber broadband network, adjusting corresponding cellular service to corresponding ones of said customers based on said division of said overall data rate associated with said premises by said number of Wi-Fi enabled devices present in association with said premises.

2. The method of claim 1, wherein calculating said average Wi-Fi speed comprises calculating an average Wi-Fi upload speed and an average Wi-Fi download speed.

3. The method of claim 2, wherein adjusting said corresponding cellular service comprises at least matching said average Wi-Fi upload speed and said average Wi-Fi download speed with said cellular service.

4. The method of claim 1, wherein adjusting said corresponding cellular service comprises at least matching said average Wi-Fi speed with said cellular service.

5. The method of claim 1, further comprising stopping said adjusting after a predetermined time period.

6. The method of claim 1, wherein:
    determining said number of said Wi-Fi enabled devices present in association with said premises comprises summing a number of users logged in to said Wi-Fi connectivity with network-provided credentials and a number of users logged in to said Wi-Fi connectivity with premises-provided credentials; and
    said step of, for those of said Wi-Fi enabled devices corresponding to said customers of said cable/fiber broadband network, adjusting said corresponding cellular service to said corresponding ones of said customers based on said average Wi-Fi speed, comprises identifying cellular devices of said users logged in to said Wi-Fi connectivity with said network-provided credentials, based on said network-provided credentials.

7. A system comprising:
    a cable/fiber broadband network Wi-Fi access point;
    a cable/fiber broadband network Wi-Fi controller of a cable/fiber broadband multi-service operator, coupled to said cable/fiber broadband network Wi-Fi access point;
    a backend server of a cellular network associated with said cable/fiber broadband multi-service operator, coupled to said Wi-Fi controller; and
    a policy control function server of said associated cellular network, coupled to said backend server;
    wherein:
        said Wi-Fi access point and said Wi-Fi controller are cooperatively configured to:
            determine a number of Wi-Fi enabled devices present in association with premises having Wi-Fi connectivity to a cable/fiber broadband network that also provides cellular service;
            calculate an average Wi-Fi speed per Wi-Fi enabled device by dividing an overall data rate associated with said premises by said number of Wi-Fi enabled devices present in association with premises having Wi-Fi connectivity to a cable/fiber broadband network, wherein an operator of the cable/fiber broadband network also offers cellular service; and
        said Wi-Fi controller, said backend server, and said policy control function server are cooperatively configured to, for those of said Wi-Fi enabled devices corresponding to customers of said cable/fiber broadband network, adjust corresponding cellular service to corresponding ones of said customers based on said division of said overall data rate associated with said premises by said number of Wi-Fi enabled devices present in association with said premises.

8. The system of claim 7, wherein said Wi-Fi access point and said Wi-Fi controller are cooperatively configured to calculate said average Wi-Fi speed by calculating an average Wi-Fi upload speed and an average Wi-Fi download speed.

9. The system of claim 8, wherein said Wi-Fi controller, said backend server, and said policy control function server are cooperatively configured to adjust said corresponding cellular service by at least matching said average Wi-Fi upload speed and said average Wi-Fi download speed with said cellular service.

10. The system of claim 7, wherein said Wi-Fi controller, said backend server, and said policy control function server are cooperatively configured to adjust said corresponding cellular service by at least matching said average Wi-Fi speed with said cellular service.

11. The system of claim 7, wherein said Wi-Fi controller, backend server, and said policy control function server are further cooperatively configured to stop said adjusting after a predetermined time period.

12. The system of claim 7, wherein:
said Wi-Fi access point and said Wi-Fi controller are cooperatively configured to determine said number of said Wi-Fi enabled devices present in association with said premises by summing a number of users logged in to said Wi-Fi connectivity with network-provided credentials and a number of users logged in to said Wi-Fi connectivity with premises-provided credentials; and
said Wi-Fi controller, said backend server, and said policy control function server are cooperatively configured to, for those of said Wi-Fi enabled devices corresponding to said customers of said cable/fiber broadband network, adjust said corresponding cellular service to said corresponding ones of said customers based on said average Wi-Fi speed, by identifying cellular devices of said users logged in to said Wi-Fi connectivity with said network-provided credentials, based on said network-provided credentials.

13. The system of claim 7, wherein said backend server of said associated cellular network comprises an authorization, authentication, and accounting (AAA) server.

* * * * *